US012634546B2

(12) United States Patent 　(10) Patent No.: US 12,634,546 B2
Zhang et al. 　(45) Date of Patent: May 19, 2026

(54) MULTIMEDIA PLAYBACK SYNCHRONIZATION

(71) Applicant: QUALCOMM Incorporated, San Diego, CA (US)

(72) Inventors: Nan Zhang, Beijing (CN); Yu Chen, Beijing (CN); Xia Zhao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/251,951

(22) PCT Filed: Dec. 11, 2020

(86) PCT No.: PCT/CN2020/135603
§ 371 (c)(1),
(2) Date: May 5, 2023

(87) PCT Pub. No.: WO2022/120782
PCT Pub. Date: Jun. 16, 2022

(65) Prior Publication Data
US 2024/0022783 A1　Jan. 18, 2024

(51) Int. Cl.
*H04N 21/43*　(2011.01)
*H04N 21/4363*　(2011.01)
(52) U.S. Cl.
CPC ... *H04N 21/4307* (2013.01); *H04N 21/43637* (2013.01)
(58) Field of Classification Search
CPC ..................... H04N 21/4307; H04N 21/43637
See application file for complete search history.

(56) References Cited

U.S. PATENT DOCUMENTS

2005/0237378 A1　10/2005　Rodman
2008/0291863 A1*　11/2008　Agren .............. H04N 21/43637
370/503

(Continued)

FOREIGN PATENT DOCUMENTS

CN　101933333 A　12/2010
CN　104584567 A　4/2015
(Continued)

OTHER PUBLICATIONS

International Search Report and Written Opinion—PCT/CN2020/135603—ISA/EPO—Sep. 9, 2021.
(Continued)

*Primary Examiner* — Thai Q Tran
*Assistant Examiner* — Jose M Mesa
(74) *Attorney, Agent, or Firm* — QUALCOMM Incorporated; Espartaco Diaz Hidalgo

(57)　ABSTRACT

A device includes one or more processors configured to obtain output delay data based on a transmission from an audio output device. The output delay data indicates a playback delay associated with audio output by the audio output device. The one or more processors are further configured to determine, based on the output delay data and host delay data, a synchronization delay to coordinate audio output by the audio output device and video output at a display. The one or more processors are further configured to initiate sending of audio data to the audio output device and to send video data to the display. The video data is delayed, based on the synchronization delay, relative to the sending of the audio data.

28 Claims, 13 Drawing Sheets

(56) References Cited

U.S. PATENT DOCUMENTS

| | | | |
|---|---|---|---|
| 2009/0060446 A1 | 3/2009 | Holden et al. | |
| 2009/0091655 A1 | 4/2009 | Russell et al. | |
| 2017/0064154 A1* | 3/2017 | Tseng ................. | H04N 21/8547 |
| 2018/0167149 A1 | 6/2018 | Stilwell et al. | |
| 2019/0068327 A1* | 2/2019 | Ho ........................ | H04L 1/0009 |
| 2019/0334985 A1* | 10/2019 | Bradley ........... | H04N 21/43637 |
| 2020/0204854 A1* | 6/2020 | Song .................... | H04N 21/439 |
| 2021/0243491 A1* | 8/2021 | Kraegeloh ....... | H04N 21/43072 |

FOREIGN PATENT DOCUMENTS

| | | | |
|---|---|---|---|
| CN | 107135413 A | 9/2017 | |
| CN | 107995503 A | 5/2018 | |
| CN | 109525881 A | 3/2019 | |
| CN | 109819303 A | 5/2019 | |
| CN | 111314763 A | 6/2020 | |
| JP | 2008066931 A | 3/2008 | |

OTHER PUBLICATIONS

Supplementary European Search Report—EP20964719—Search Authority—Munich—Apr. 17, 2024.

Taiwan Search Report—TW110135904—TIPO—Nov. 13, 2024.

* cited by examiner

800

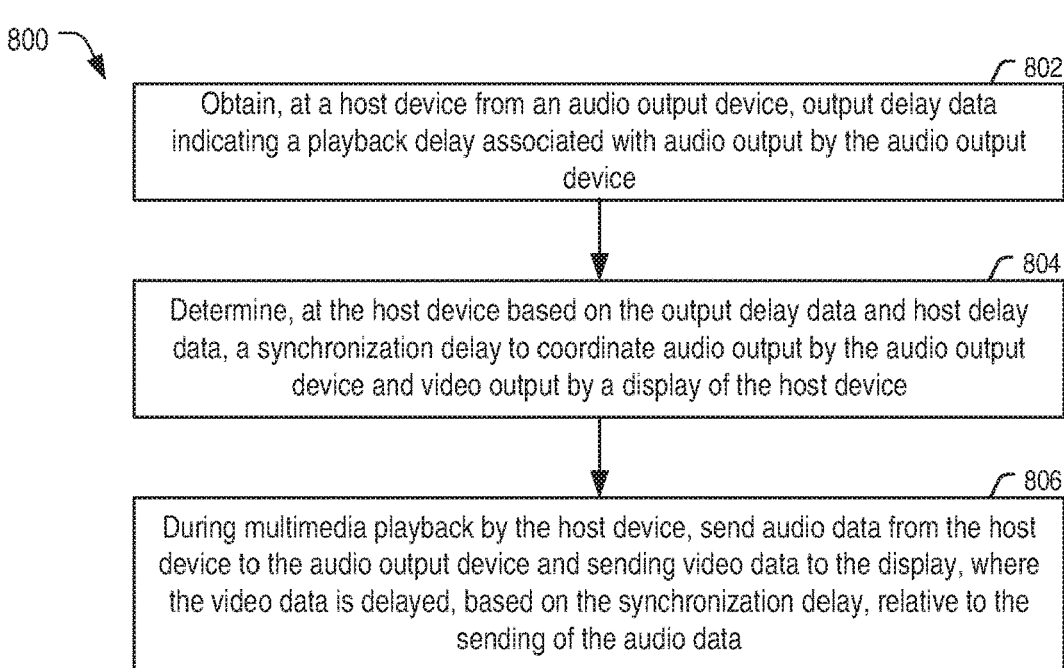

802

Obtain, at a host device from an audio output device, output delay data indicating a playback delay associated with audio output by the audio output device

804

Determine, at the host device based on the output delay data and host delay data, a synchronization delay to coordinate audio output by the audio output device and video output by a display of the host device

806

During multimedia playback by the host device, send audio data from the host device to the audio output device and sending video data to the display, where the video data is delayed, based on the synchronization delay, relative to the sending of the audio data

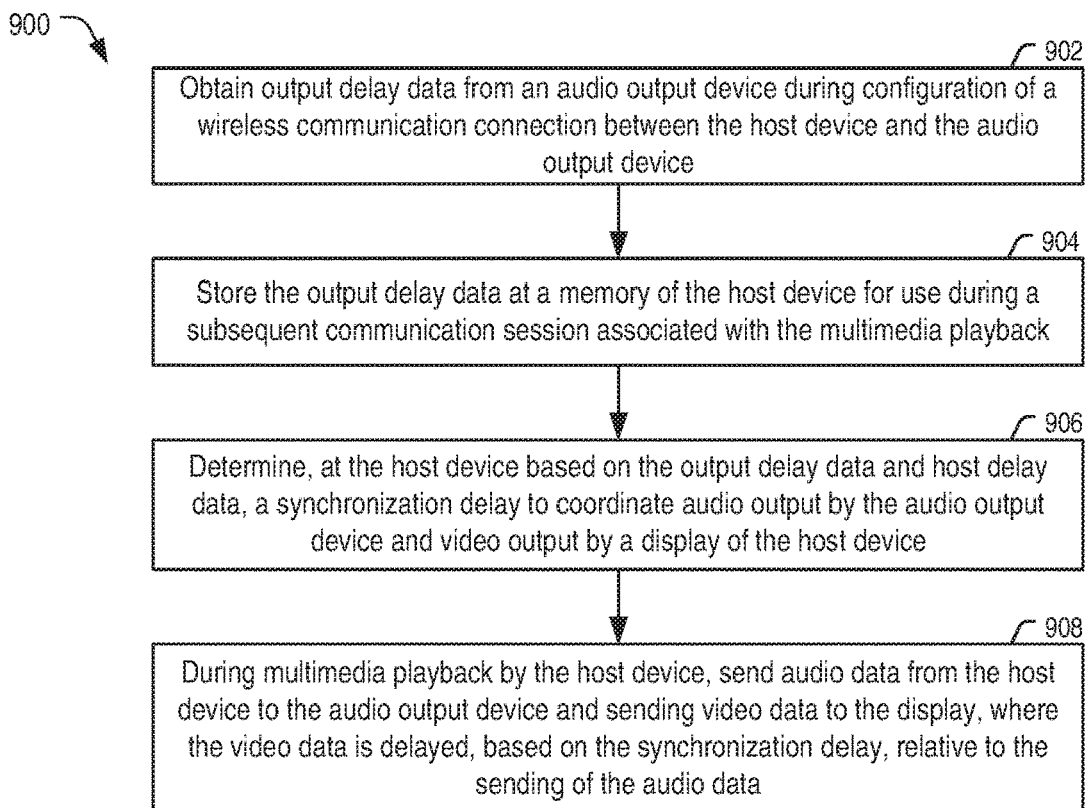

902

Obtain output delay data from an audio output device during configuration of a wireless communication connection between the host device and the audio output device

904

Store the output delay data at a memory of the host device for use during a subsequent communication session associated with the multimedia playback

906

Determine, at the host device based on the output delay data and host delay data, a synchronization delay to coordinate audio output by the audio output device and video output by a display of the host device

908

During multimedia playback by the host device, send audio data from the host device to the audio output device and sending video data to the display, where the video data is delayed, based on the synchronization delay, relative to the sending of the audio data

Figures 10, 11:
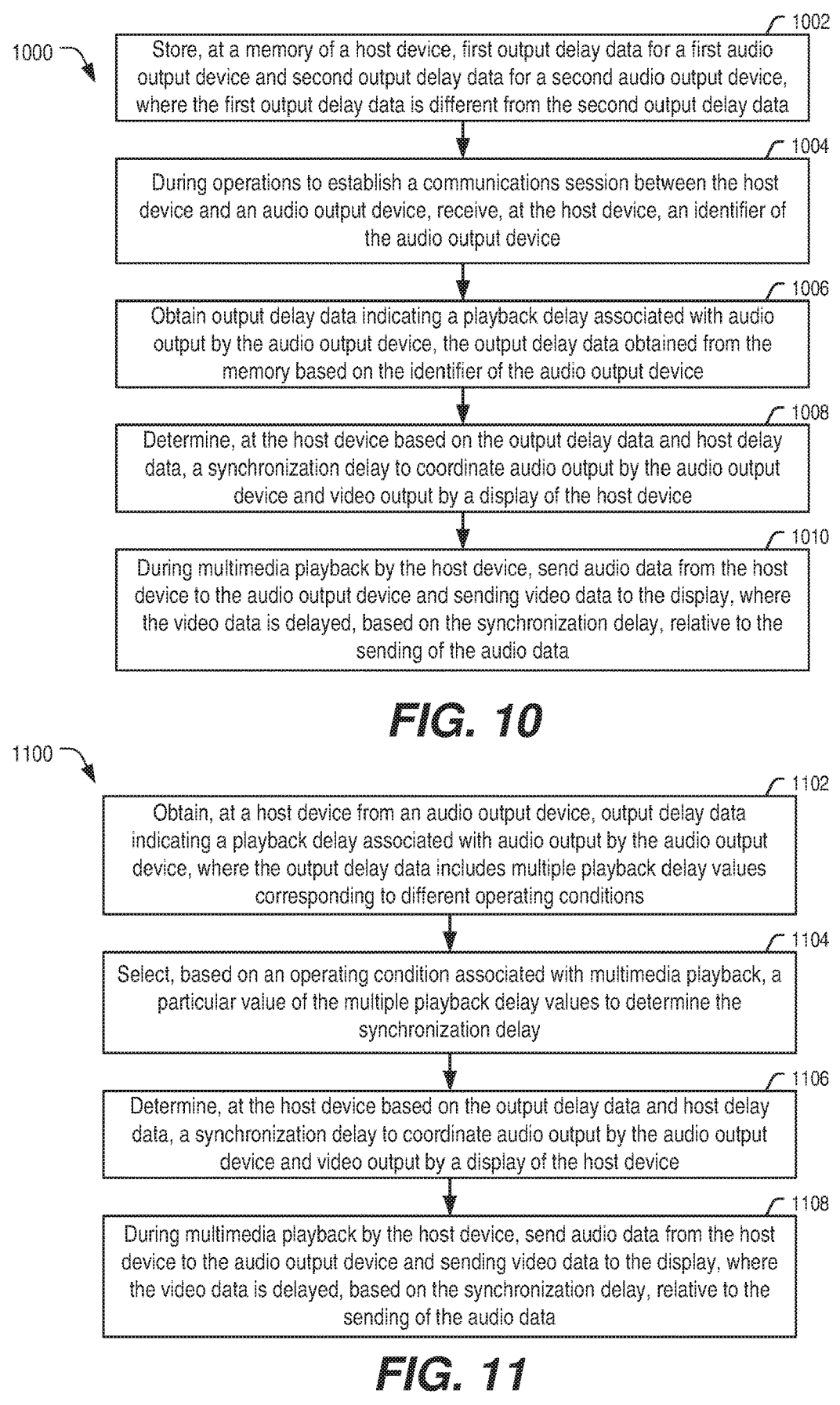

1002
Store, at a memory of a host device, first output delay data for a first audio output device and second output delay data for a second audio output device, where the first output delay data is different from the second output delay data 1004
During operations to establish a communications session between the host device and an audio output device, receive, at the host device, an identifier of the audio output device 1006
Obtain output delay data indicating a playback delay associated with audio output by the audio output device, the output delay data obtained from the memory based on the identifier of the audio output device 1008
Determine, at the host device based on the output delay data and host delay data, a synchronization delay to coordinate audio output by the audio output device and video output by a display of the host device 1010
During multimedia playback by the host device, send audio data from the host device to the audio output device and sending video data to the display, where the video data is delayed, based on the synchronization delay, relative to the sending of the audio data

1102
Obtain, at a host device from an audio output device, output delay data indicating a playback delay associated with audio output by the audio output device, where the output delay data includes multiple playback delay values corresponding to different operating conditions 1104
Select, based on an operating condition associated with multimedia playback, a particular value of the multiple playback delay values to determine the synchronization delay 1106
Determine, at the host device based on the output delay data and host delay data, a synchronization delay to coordinate audio output by the audio output device and video output by a display of the host device 1108
During multimedia playback by the host device, send audio data from the host device to the audio output device and sending video data to the display, where the video data is delayed, based on the synchronization delay, relative to the sending of the audio data

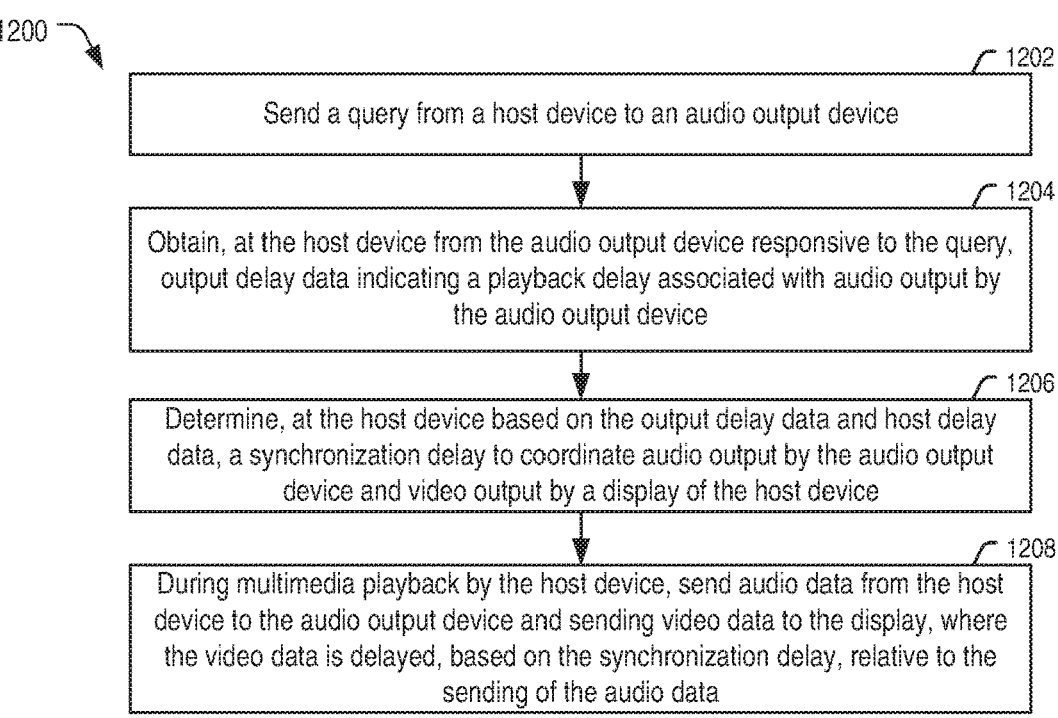

1202
Send a query from a host device to an audio output device

1204
Obtain, at the host device from the audio output device responsive to the query, output delay data indicating a playback delay associated with audio output by the audio output device 1206
Determine, at the host device based on the output delay data and host delay data, a synchronization delay to coordinate audio output by the audio output device and video output by a display of the host device 1208
During multimedia playback by the host device, send audio data from the host device to the audio output device and sending video data to the display, where the video data is delayed, based on the synchronization delay, relative to the sending of the audio data

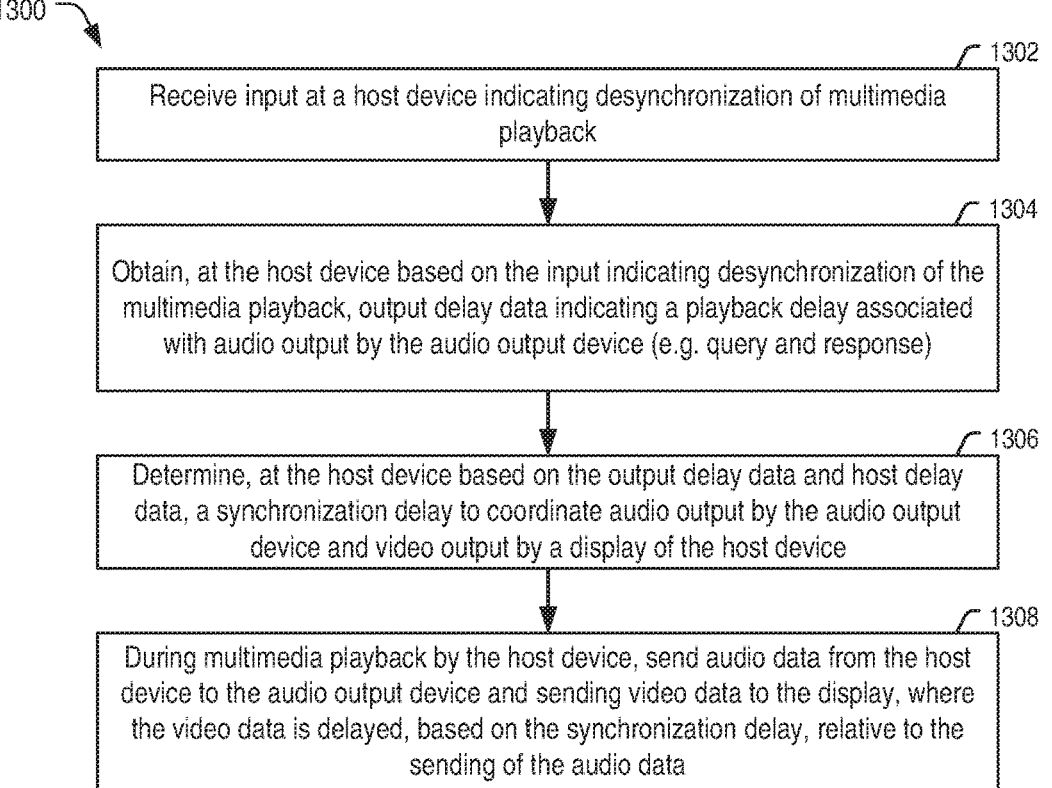

1302
Receive input at a host device indicating desynchronization of multimedia playback 1304
Obtain, at the host device based on the input indicating desynchronization of the multimedia playback, output delay data indicating a playback delay associated with audio output by the audio output device (e.g. query and response)

1306
Determine, at the host device based on the output delay data and host delay data, a synchronization delay to coordinate audio output by the audio output device and video output by a display of the host device 1308
During multimedia playback by the host device, send audio data from the host device to the audio output device and sending video data to the display, where the video data is delayed, based on the synchronization delay, relative to the sending of the audio data

*FIG. 13*

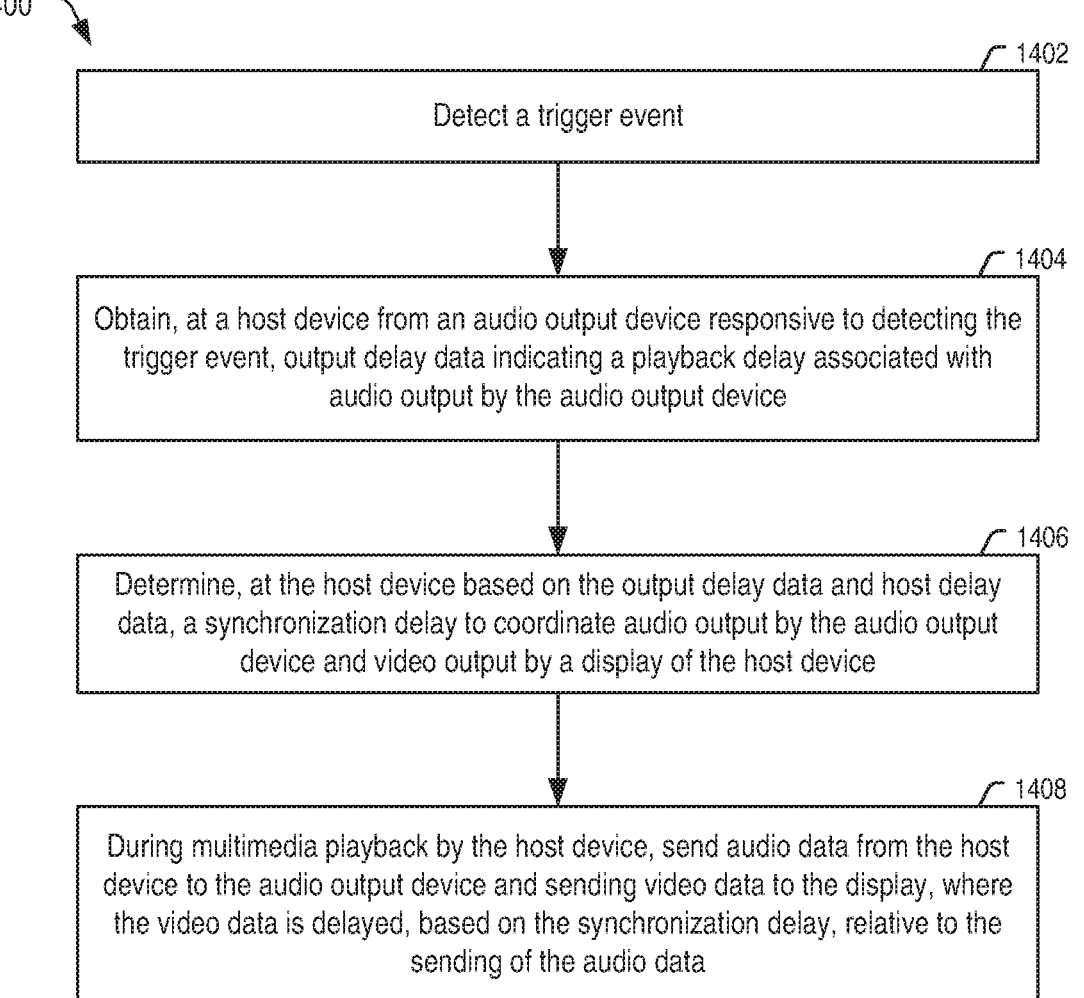

1400

1402

Detect a trigger event

1404

Obtain, at a host device from an audio output device responsive to detecting the trigger event, output delay data indicating a playback delay associated with audio output by the audio output device

1406

Determine, at the host device based on the output delay data and host delay data, a synchronization delay to coordinate audio output by the audio output device and video output by a display of the host device

1408

During multimedia playback by the host device, send audio data from the host device to the audio output device and sending video data to the display, where the video data is delayed, based on the synchronization delay, relative to the sending of the audio data

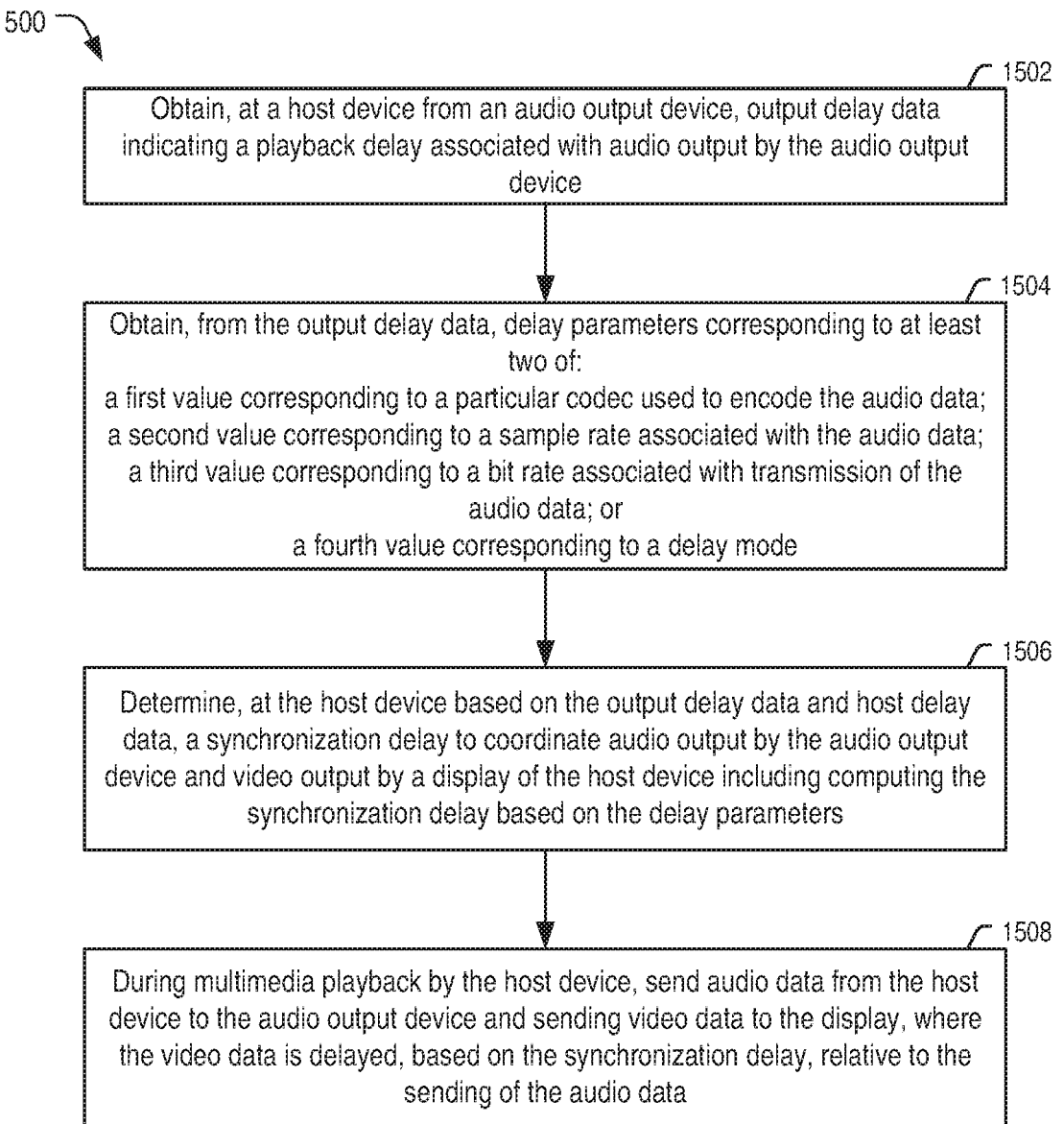

1502

Obtain, at a host device from an audio output device, output delay data indicating a playback delay associated with audio output by the audio output device

1504

Obtain, from the output delay data, delay parameters corresponding to at least two of:
a first value corresponding to a particular codec used to encode the audio data;
a second value corresponding to a sample rate associated with the audio data;
a third value corresponding to a bit rate associated with transmission of the audio data; or
a fourth value corresponding to a delay mode

1506

Determine, at the host device based on the output delay data and host delay data, a synchronization delay to coordinate audio output by the audio output device and video output by a display of the host device including computing the synchronization delay based on the delay parameters

1508

During multimedia playback by the host device, send audio data from the host device to the audio output device and sending video data to the display, where the video data is delayed, based on the synchronization delay, relative to the sending of the audio data

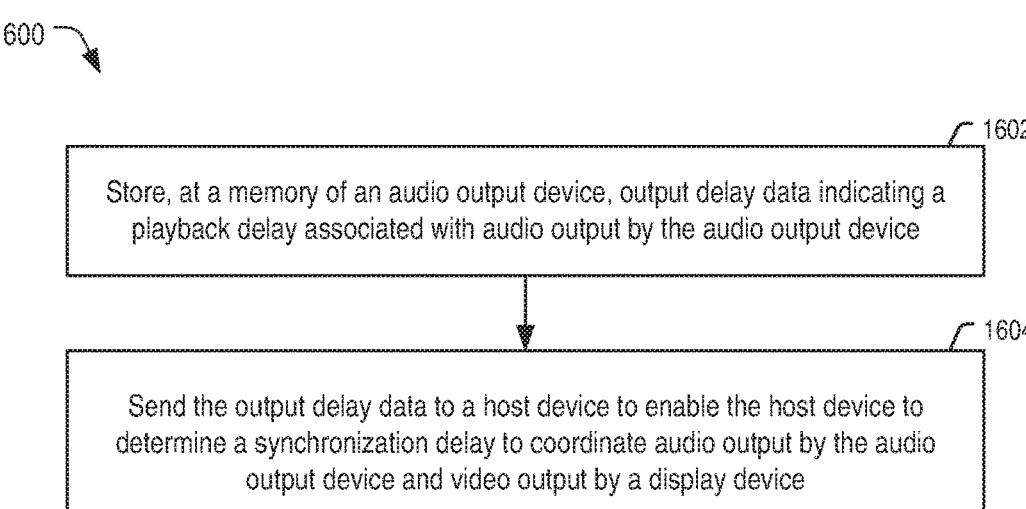

Store, at a memory of an audio output device, output delay data indicating a playback delay associated with audio output by the audio output device

1604

Send the output delay data to a host device to enable the host device to determine a synchronization delay to coordinate audio output by the audio output device and video output by a display device

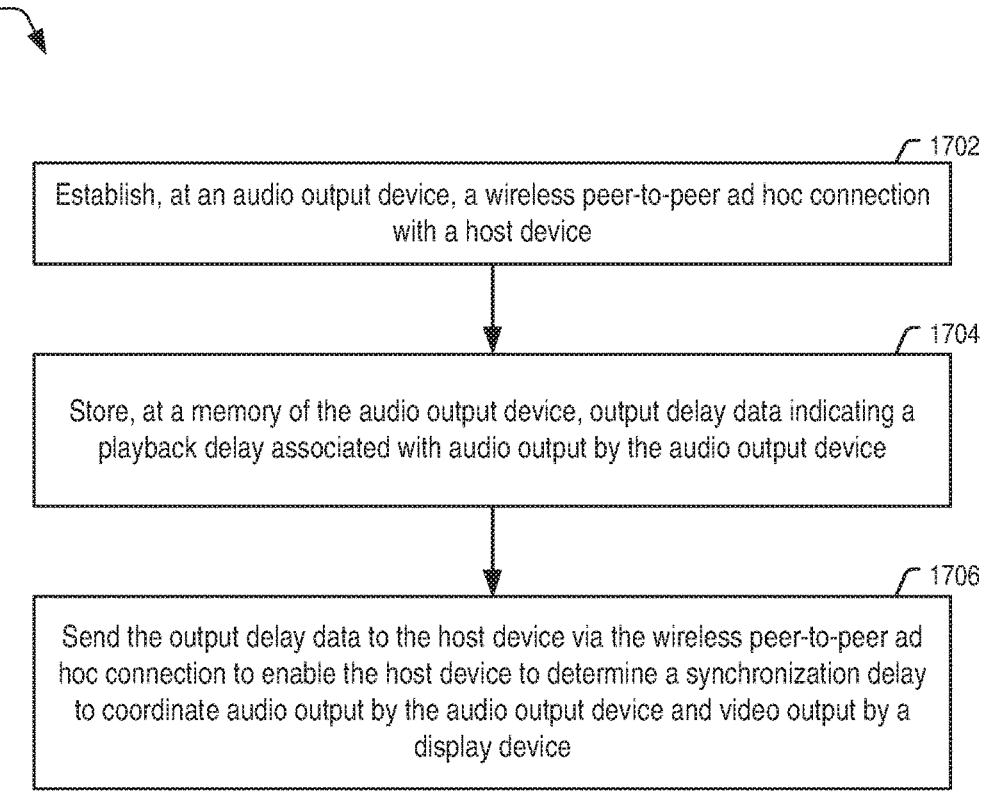

Establish, at an audio output device, a wireless peer-to-peer ad hoc connection with a host device

1704

Store, at a memory of the audio output device, output delay data indicating a playback delay associated with audio output by the audio output device

1706

Send the output delay data to the host device via the wireless peer-to-peer ad hoc connection to enable the host device to determine a synchronization delay to coordinate audio output by the audio output device and video output by a display device

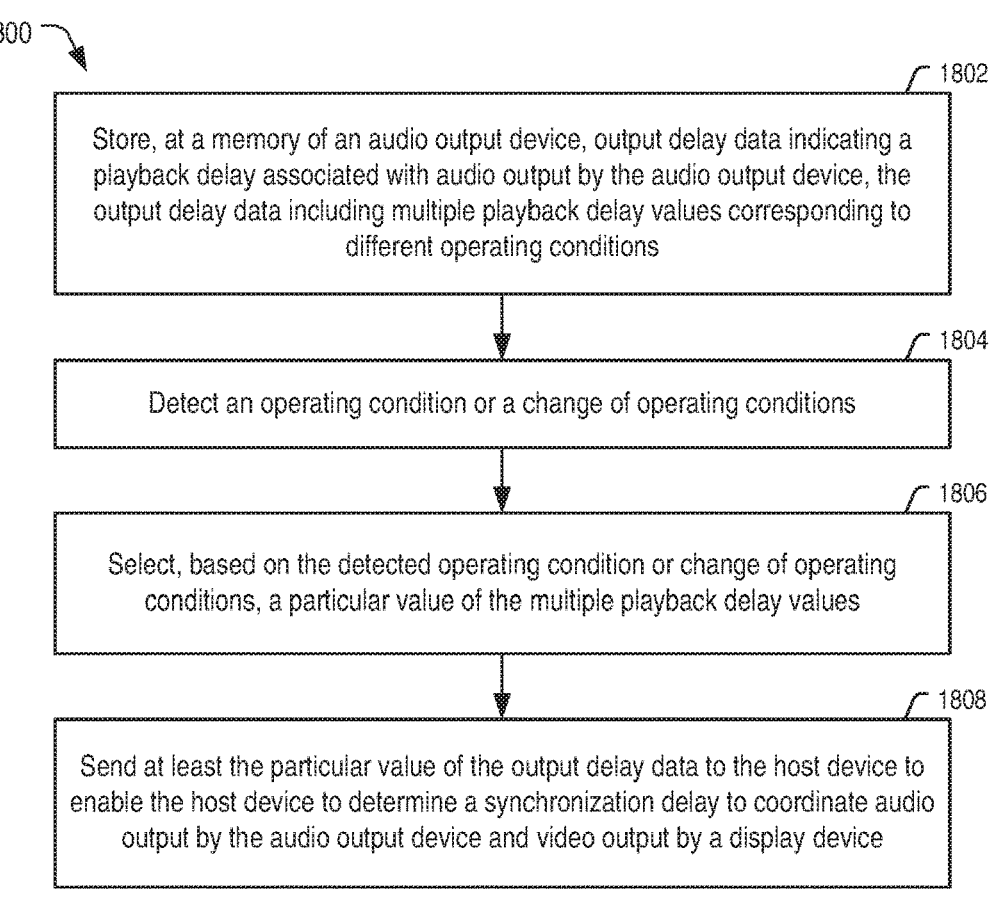

1802

Store, at a memory of an audio output device, output delay data indicating a playback delay associated with audio output by the audio output device, the output delay data including multiple playback delay values corresponding to different operating conditions

1804

Detect an operating condition or a change of operating conditions

1806

Select, based on the detected operating condition or change of operating conditions, a particular value of the multiple playback delay values

1808

Send at least the particular value of the output delay data to the host device to enable the host device to determine a synchronization delay to coordinate audio output by the audio output device and video output by a display device

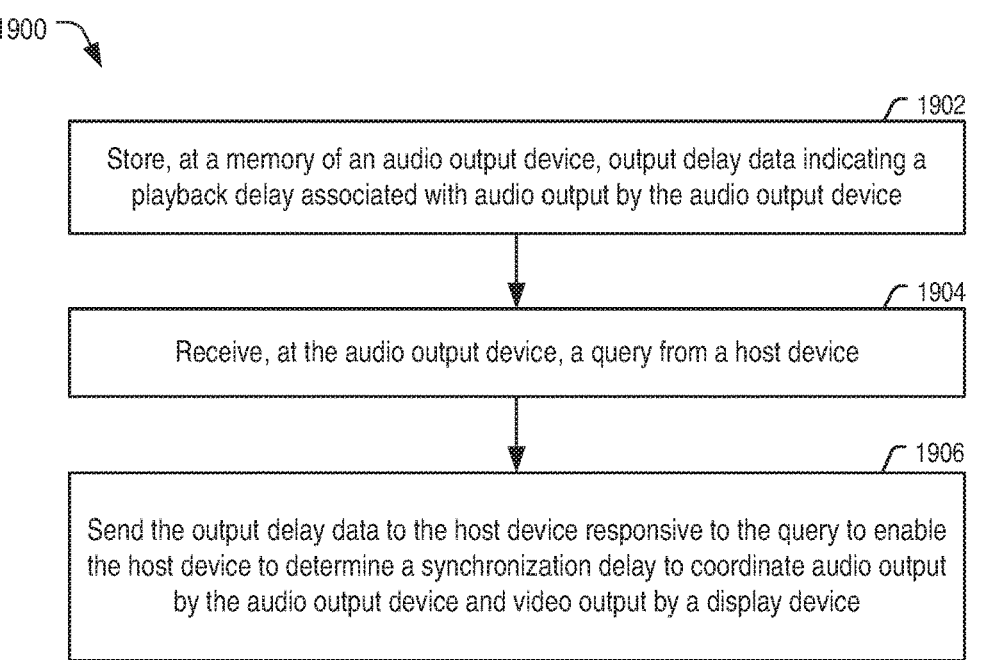

1902

Store, at a memory of an audio output device, output delay data indicating a playback delay associated with audio output by the audio output device

1904

Receive, at the audio output device, a query from a host device

1906

Send the output delay data to the host device responsive to the query to enable the host device to determine a synchronization delay to coordinate audio output by the audio output device and video output by a display device

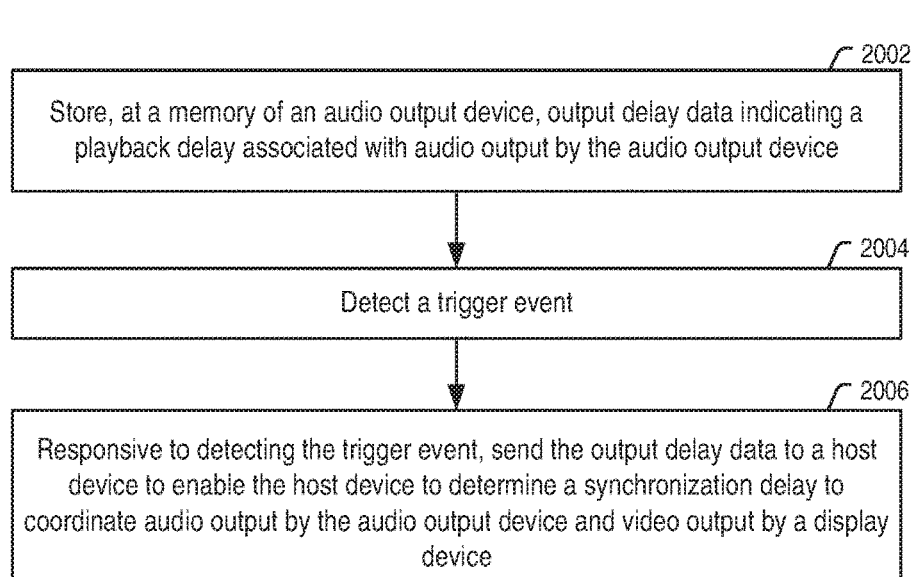

2002

Store, at a memory of an audio output device, output delay data indicating a playback delay associated with audio output by the audio output device

2004

Detect a trigger event

2006

Responsive to detecting the trigger event, send the output delay data to a host device to enable the host device to determine a synchronization delay to coordinate audio output by the audio output device and video output by a display device

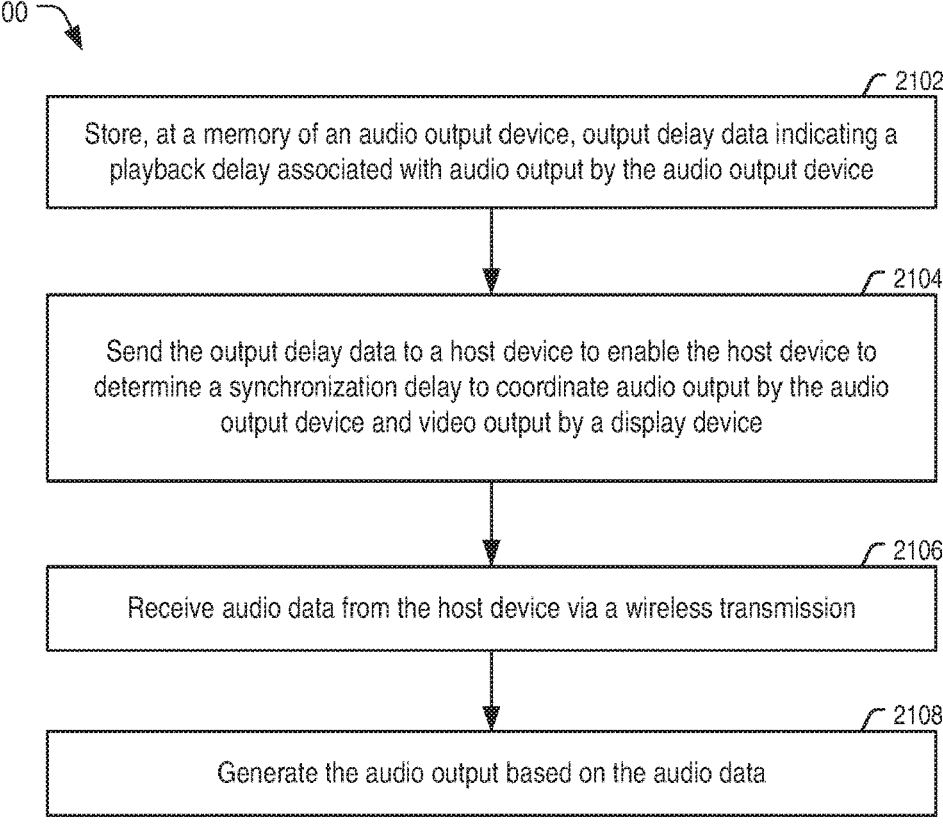

2102

Store, at a memory of an audio output device, output delay data indicating a playback delay associated with audio output by the audio output device

2104

Send the output delay data to a host device to enable the host device to determine a synchronization delay to coordinate audio output by the audio output device and video output by a display device

2106

Receive audio data from the host device via a wireless transmission

2108

Generate the audio output based on the audio data

*FIG. 21*

MULTIMEDIA PLAYBACK SYNCHRONIZATION

I. FIELD

The present disclosure is generally related to multimedia playback synchronization.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to playback multimedia content, such as games or movies or other media that includes video and sound. Additionally, some such computing devices incorporate functionality to send video, audio, or both to one or more other devices for output. To illustrate, video of the multimedia content may be output at a local display of a computing device and the computing device may send audio of the multimedia content to a speaker, headphones, or another audio output device.

When one computing device outputs both the video and the audio during multimedia playback, the computing device can control synchronization of the audio and video. However, when the audio and the video are output by different devices, it can be challenging to synchronize the audio and video. To illustrate, when a computing device outputs video via a local display and sends corresponding audio to headphones, the headphones may process the audio in a manner that introduces unaccounted for delay, which causes the audio and video to become unsynchronized during playback.

III. SUMMARY

According to one implementation of the present disclosure, a device includes one or more processors configured to obtain output delay data based on a transmission from an audio output device. The output delay data indicates a playback delay associated with audio output by the audio output device. The one or more processors are further configured to determine, based on the output delay data and host delay data, a synchronization delay to coordinate audio output by the audio output device and video output at a display. The one or more processors are further configured to initiate sending of audio data to the audio output device and to send video data to the display. The video data is delayed, based on the synchronization delay, relative to the sending of the audio data.

According to another implementation of the present disclosure, a method includes obtaining, at a host device from an audio output device, output delay data indicating a playback delay associated with audio output by the audio output device. The method further includes determining, at the host device based on the output delay data and host delay data, a synchronization delay to coordinate audio output by the audio output device and video output by a display of the host device. The method also includes, during multimedia playback by the host device, sending audio data from the host device to the audio output device and sending video data to the display. The video data is delayed, based on the synchronization delay, relative to the sending of the audio data.

According to another implementation of the present disclosure, a device includes means for sending audio data to an audio output device and means for receiving, via a transmission from the audio output device, output delay data indicating a playback delay associated with audio output by the audio output device. The device also includes means for synchronizing multimedia playback. The means for synchronizing is configured to determine, based on the output delay data and host delay data, a synchronization delay to coordinate audio output by the audio output device and video output at a display. The means for synchronizing is further configured to cause the means for sending audio data to send the audio data to the audio output device and to send video data to the display. The video data is delayed, based on the synchronization delay, relative to the sending of the audio data.

According to another implementation of the present disclosure, a device includes a receiver configured to receive signals encoding audio data from a host device and a decoder configured to generate audio signals based on the audio data. The device also includes one or more sound transducers configured to generate audio output based on the audio signals. The device further includes a memory configured to store output delay data including one or more playback delay values. A particular playback delay, value indicates an output device total delay time between transmission of particular audio data by the host device and playout of sound corresponding to the particular audio data by the one or more sound transducers. The device also includes a transmitter configured to send at least one playback delay value of the one or more playback delay values to the host device to enable the host device to determine a synchronization delay to synchronize the audio output with video output by a display of the host device.

According to another implementation of the present disclosure, a method includes storing, at a memory of an audio output device, output delay data indicating a playback delay associated with audio output by the audio output device. The method also includes sending the output delay data to a host device to enable the host device to determine a synchronization delay to coordinate audio output by the audio output device and video output by a display device.

According to another implementation of the present disclosure, a device includes means for receiving signals encoding audio data from a host device and means for decoding the signals to generate audio signals based on the audio data. The device also includes means for generating audio output based on the audio signals. The device further includes means for storing output delay data including one or more playback delay values. A particular playback delay value indicates an output device total delay time between transmission of particular audio data by the host device and playout of sound corresponding to the particular audio data by the means for generating audio output. The device also includes means for sending at least one playback delay value of the one or more playback delay values to the host device to enable the host device to determine a synchronization delay to synchronize the audio output with video output by a display of the host device.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

FIG. 8 is a diagram of a particular implementation of a method of synchronizing audio and video during multimedia playback that may be performed by the system of FIG. 1 in accordance with some examples of the present disclosure.

FIG. 9 is a diagram of a particular implementation of a method of synchronizing audio and video during multimedia playback that may be performed by the system of FIG. 1 in accordance with some examples of the present disclosure.

FIG. 10 is a diagram of a particular implementation of a method of synchronizing audio and video during multimedia playback that may be performed by the system of FIG. 1 in accordance with some examples of the present disclosure.

FIG. 11 is a diagram of a particular implementation of a method of synchronizing audio and video during multimedia playback that may be performed by the system of FIG. 1 in accordance with some examples of the present disclosure.

FIG. 12 is a diagram of a particular implementation of a method of synchronizing audio and video during multimedia playback that may be performed by the system of FIG. 1 in accordance with some examples of the present disclosure.

FIG. 13 is a diagram of a particular implementation of a method of synchronizing audio and video during multimedia playback that may be performed by the system of FIG. 1 in accordance with some examples of the present disclosure.

FIG. 14 is a diagram of a particular implementation of a method of synchronizing audio and video during multimedia playback that may be performed by the system of FIG. 1 in accordance with some examples of the present disclosure.

FIG. 15 is a diagram of a particular implementation of a method of synchronizing audio and video during multimedia playback that may be performed by the system of FIG. 1 in accordance with some examples of the present disclosure.

FIG. 16 is a diagram of a particular implementation of a method of synchronizing audio and video during multimedia playback that may be performed by the system of FIG. 1 in accordance with some examples of the present disclosure.

FIG. 17 is a diagram of a particular implementation of a method of synchronizing audio and video during multimedia playback that may be performed by the system of FIG. 1 in accordance with some examples of the present disclosure.

FIG. 18 is a diagram of a particular implementation of a method of synchronizing audio and video during multimedia playback that may be performed by the system of FIG. 1 in accordance with some examples of the present disclosure.

FIG. 19 is a diagram of a particular implementation of a method of synchronizing audio and video during multimedia playback that may be performed by the system of FIG. 1 in accordance with some examples of the present disclosure.

FIG. 20 is a diagram of a particular implementation of a method of synchronizing audio and video during multimedia playback that may be performed by the system of FIG. 1 in accordance with some examples of the present disclosure.

FIG. 21 is a diagram of a particular implementation of a method of synchronizing audio and video during multimedia playback that may be performed by the system of FIG. 1 in accordance with some examples of the present disclosure.

DETAILED DESCRIPTION

Figure 1:
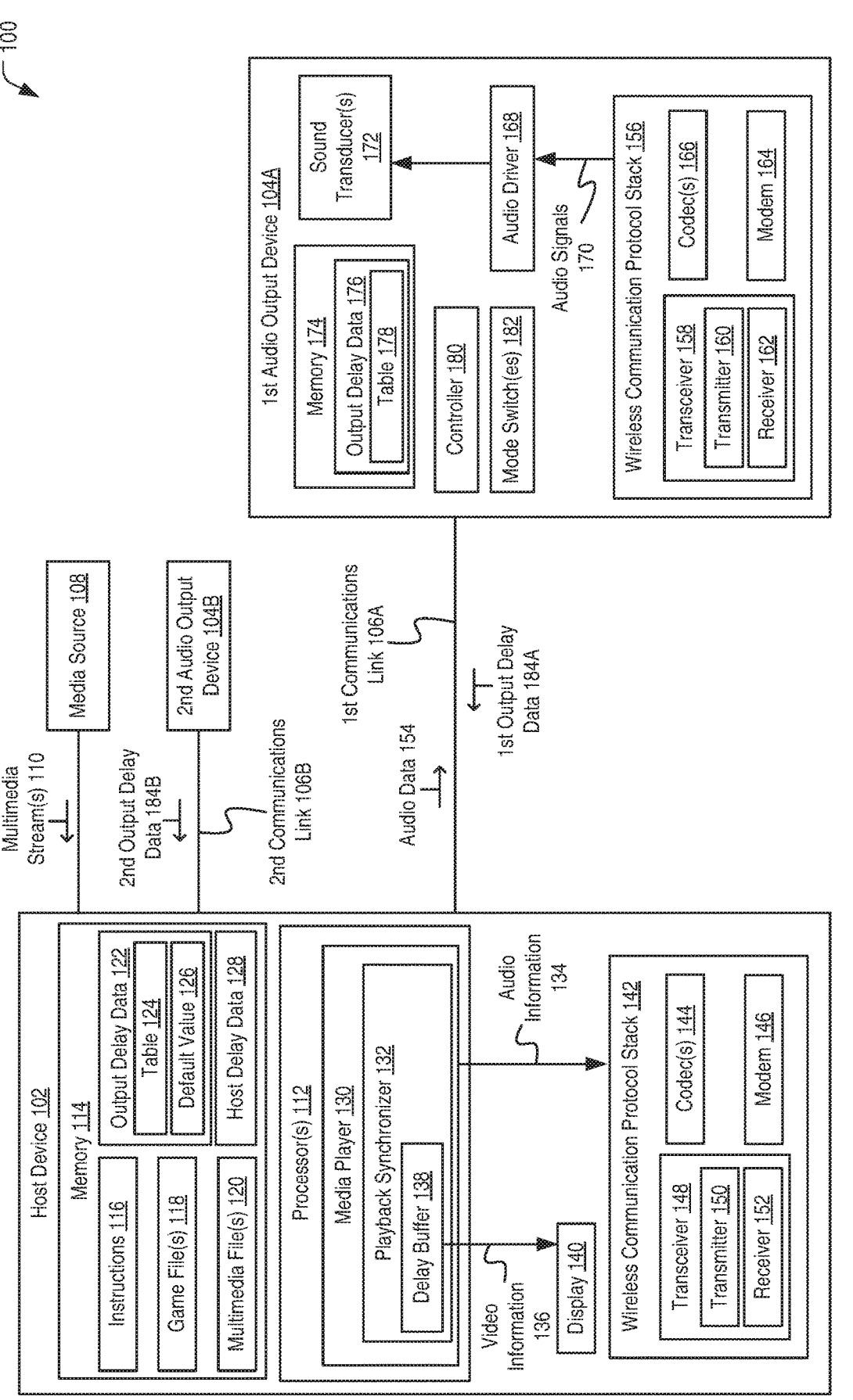
FIG. 1 is a block diagram of a particular illustrative aspect of a system operable to synchronize audio and video during multimedia playback in accordance with some examples of the present disclosure.

It can be challenging to synchronize multimedia playback at different devices. For example, one common scenario for multimedia playback is displaying video locally and sending audio to a separate audio output device, such as headphones, earbuds, or a speaker. In this example, during playback of multimedia content, a computing device processes video data of the multimedia content locally and outputs video from the video data at a local display. The computing device transmits audio data of the multimedia content to the audio output device. Transmission of the audio data to the audio output device and processing of the audio data by the audio output device both introduce delays that can lead to desynchronization of the video and audio during playback.

The computing device can delay output of the video by some predefined value, but the actual delay experienced by the audio data can vary from one audio output device to another, from one operating mode to another, or based on other factors. For example, a first set of headphones may take longer to process and output received audio data than a second set of headphones. Such differences are due to hardware differences between the headphones, software differences between the headphones, or both. To illustrate, high-end headphones may introduce processing steps, such as custom equalization, noise cancellation, etc., to ensure high-fidelity sound output. As a result, the high-end headphones may have a longer delay between transmission of audio data to the headphones and output of corresponding sound than occurs with lower-end headphones. As another example, some audio output devices have different modes of operation that can introduce differences in audio output delay. To illustrate, a set of headphones may have a longer audio output delay when a noise-cancellation mode is turned on than when the noise-cancellation mode is turned off.

In a particular aspect disclosed herein, synchronization of multimedia playback is facilitated by communicating audio output delay data from an audio output device to a host device. The host device uses the audio output delay data to determine a synchronization delay to coordinate audio output by the audio output device and video output at a display coupled to or integrated within the host device. For example, the host device may delay playback of a particular video frame (or set of video frames) to account for host delay (e.g., a time between transmission of an audio packet to the audio output device and playout of video associated with sound of the audio packet) nd the audio playback delay.

In a particular aspect, the audio output delay data is updated occasionally. For example, the audio output device may automatically (e.g., on its own, without prompting or input) send updated audio output delay data to the host device based on a schedule, when a new media playback session is initiated, or when a trigger event is detected. In this example, the trigger event can be any change in conditions that will result in a change in the audio output delay. To illustrate, the trigger event can include a change of the operating mode of the audio output device (e.g., turning on or turning off stereo output or noise cancellation) or a change of signaling characteristics between the host device and the audio output device (e.g., an increase in the number of dropped packets).

In another example, the audio output device may send updated audio output delay data to the host device in response to a query from the host device. In this example, the host device may query the audio output device based on a schedule (e.g., to confirm that the audio output delay data has not changed), when a new media playback session is initiated, or when a trigger event is detected. In this example, the trigger event can be any change in conditions at the host device that could affect multimedia synchronization. To illustrate, the trigger event can include a change of signaling characteristics between the host device and the audio output device (e.g., an increase in packet retransmission requests from the audio playback device), input at the host device that indicates multimedia synchronization (e.g., user input indicating that the audio and video are not synchronized), a change in operating mode of the host device (e.g., a change from a video streaming mode to a gaming mode), or a change of encoding schemes used to send the audio data to the audio output device.

In a particular aspect, the host device may store audio output delay data for multiple audio output devices. For example, when a connection is established between the host device and a new audio output device, the host device may store audio output delay data for the new audio output device for use in a future multimedia playback session.

Thus, aspects disclosed herein enable improved synchronization of multimedia playback by enabling a host device to determine when to play out video corresponding to audio played out be a separate audio output device. The synchronization improvements can be extended across a variety of situations, such as different audio output devices and different operating conditions, leading to improved user experience during multimedia playback.

Particular aspects of the present disclosure are described below with reference to the drawings. In the description, common features are designated by common reference numbers. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple examples of audio output devices are illustrated and associated with reference numbers 104A and 104B. When referring to a particular one of these audio output devices, such as a first audio output device 104A, the distinguishing letter "A" is used. However, when referring to any arbitrary one of these audio output devices or to these audio output devices as a group, the reference number 104 is used without a distinguishing letter.

As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a host device 102 including one or more processors ("processor(s)" 112 of FIG. 1), which indicates that in some implementations the host device 102 includes a single processor 112 and in other implementations the host device 102 includes multiple processors 112. For ease of reference herein, such features are generally introduced as "one or more" features and may subsequently be referred to in the singular or optional singular using "(s)" unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to synchronize audio and video during multimedia playback is disclosed and generally designated 100. The system 100 includes a host device 102 and one or more audio output devices 104, including a first audio output device 104A and a second audio output device 104B. The host device 102 and the audio output device(s) 104 are configured to cooperate to synchronize audio and video during multimedia playback, as described further below.

The host device 102 includes one or more processors 112, a memory 114, and a wireless communication protocol stack 142. The memory 114 stores instructions 116 that are executable by the processor(s) 112. Additionally, the memory 114 stores output delay data 122 and host delay data 128. The output delay data 122 includes information indicating audio output delay associated with one or more of the audio output devices 104, and the host delay data 128 includes information about media playback delay at the host device 102. In a particular example, the output delay data for a particular audio output device 104 (such as the first audio output device 104A) indicates an output device total delay time between transmission of an audio packet to the particular audio output device 104 and playout of sound corresponding to the audio packet by the particular audio output device 104. As one example, the output delay data 122 may be based on testing of the audio output device 104 (e.g., by a manufacturer, a certification laboratory, a seller, or a user). In a particular example, the host delay data 128 indicates a host device total delay time between transmission of an audio packet to one of the audio output devices 104 and playout of video associated with sound of the audio packet. As one example, the host delay data 128 is based on testing of the host device 102 (e.g., by a manufacturer, a certification laboratory, a seller, or a user).

The wireless communication protocol stack 142 includes hardware and software used by the host device 102 to establish wireless communications link(s) 106 with the audio output device(s) 104 and to transfer data via the communications link(s) 106. For example, in FIG. 1, the wireless communication protocol stack 142 includes a transceiver 148 including a transmitter 150 and a receiver 152. Additionally, the wireless communication protocol stack 142 includes a modem 146 and one or more codecs 144.

Each of the audio output devices 104 includes a wireless communication protocol stack configured to communicate with the wireless communication protocol stack 142 of the host device 102. For example, in FIG. 1, the first audio output device 104A includes a wireless communication protocol stack 156. The wireless communication protocol stack 156 includes a transceiver 158 including a transmitter 160 and a receiver 162. Additionally, the wireless communication protocol stack 156 includes a modem 164 and one or more codecs 166.

In a particular aspect, the wireless communication protocol stack 142 and the wireless communication protocol stack 156 cooperate to establish the communications link(s) 106. In a particular example, the communications link(s) 106 correspond to or are conducted via a wireless peer-to-peer ad hoc connection, such as a connection that conforms to a BLUETOOTH® protocol specification (BLUETOOTH is a registered trademark of BLUETOOTH SIG, INC. of Kirkland, Washington, USA), a connection that conforms to an IEEE protocol specification (IEEE is a registered trademark of The Institute of Electrical and Electronics Engineers, Inc. Piscataway New Jersey, USA), a connection that conforms to a proprietary protocol, or another wireless peer-to-peer ad hoc connection.

In FIG. 1, the first audio output device 104A includes an audio driver 168 coupled to the wireless communication protocol stack 156 and a sound transducer 172 coupled to the audio driver 168. In this configuration, the first audio output device 104A is configured to receive, at the wireless communication protocol stack 156, audio data 154 from the host device 102 via the communications link 106A. The wireless communication protocol stack 156 processes the audio data 154 (e.g., using the modem 164 and one or more of the codec(s) 166) to generate audio signals 170, which the audio driver 168 uses to actuate the sound transducer(s) 172 to generate sound (e.g., audio output corresponding to the audio data 154). Although details of the second audio output device 104B are not shown in FIG. 1, the second audio output device 104B may include the same or similar components to the components of the first audio output device 104A.

In the example illustrated in FIG. 1, the first audio output device 104A includes a memory 174 that stores output delay data 176 associated with the first audio output device 104A. In some examples, the output delay data 176 includes a single delay value representing the audio output delay associated with the first audio output device 104A. In other examples, the output delay data 176 includes multiple delay values representing the audio output delay associated with the first audio output device 104A for different circumstances, such as different operating modes. In the example illustrated in FIG. 1, the output delay data 176 includes a table 178 (or another data structure) that includes multiple distinct output delay values. In this example, the output delay values represent audio output delay of the first audio output device 104A in different situations. To illustrate, the table 178 may include a first playback delay value associated with use of a first codec of the codec(s) 166 to decode the audio data 154 and a second playback delay value associated with use of a second codec of the codec(s) 166. As another illustration, the table 178 may include multiple playback delay values corresponding to different operating conditions of the audio output device 104, where the different operating conditions include, for example, a number of audio channels processed (e.g., a mono output mode, a stereo output mode, or various surround sound output modes), whether additional audio processing (e.g., noise cancellation or equalization) is performed, etc. When the table 178 includes playback delay values for different operating conditions, the table 178 may also include data identifying the different operating conditions to facilitate selection of an appropriate playback delay value for a particular operating condition.

In the example illustrated in FIG. 1, the first audio output device 104A includes one or more mode switches 182. Each of the mode switch(es) 182 is a physical switch, an electronic switch, or a software switch (e.g., a settable flag or bit) that indicates the operating mode of the first audio output device 104A. In this example, a controller 180 of the first audio output device 104A is configured to select a particular output delay value from the output delay data 176 based on the operating mode of the first audio output device 104A as indicated by the mode switch(es) 182. In this example, the controller 180 is configured to cause the selected output delay value to be transmitted to the host device 102 via the first communications link 106A as first output delay data 1841. To illustrate, the output delay data 184A is sent via wireless messaging in accordance with one or more stack layers of the wireless communication protocol stacks 142, 156 associated with the communications link 106A with the first audio output device 104A.

In other examples, the controller 180 selects the particular output delay value sent as the first output delay data 184A based on factors other than, or in addition to, the operating mode indicated by mode switch(es) 182. To illustrate, the wireless communication protocol stack 156 may include hardware to determine signaling characteristics associated with the first communications link 106A, such as a signal to noise ratio, a packet loss rate, a data rate, a signal strength, etc. In this example, the wireless communication protocol stack 156 may provide information descriptive of the signaling characteristics to the controller 180, and the controller 180 may select the particular output delay value sent as the first output delay data 184A based on the signaling characteristics.

In some examples, the first audio output device 104A is configured to send all of the output delay data 176 to the host device 102 as the first output delay data 184A to enable the host device 102 to select a particular output delay value from the output delay data 176. For example, the first audio output device 104A may send the output delay data 176 to the host device 102 during set up of the first communications link 106A (e.g., as part of a handshake data exchange to establish the first communications link 106A). As another example, the first audio output device 104A may send the output delay data 176 to the host device 102 in response to a query from the host device 102 or at the beginning of a media playback session (e.g., after the host device 102 sends the first few audio data packets of a media stream or when the host device 102 indicates that a media playback session is about to begin).

During operation, the host device 102 obtains multimedia content. For example, the memory 114 may store one or more game files 118 that are executable by the processor(s) 112 to generate video information 136 and audio information 134. As another example, the memory 114 may store multimedia files 120 and/or the host device 102 may obtain the multimedia content as a multimedia stream 110 or download from a remote media source 108. The instructions 116 may include a media player 130 that is executable by the processor(s) 112 to generate the video information 136 and the audio information 134 based on the multimedia content.

In the example of FIG. 1, the media player 130 includes a playback synchronizer 132. The playback synchronizer 132 is configured to determine the synchronization delay to coordinate audio output by the audio output device(s) 104 and video output at a display 140 coupled to or integrated within the host device 102. The playback synchronizer 132 determines the synchronization delay based on the output delay data 122 received from the audio output device(s) 104 and based on the host delay data 128. For example, the synchronization delay corresponds to a sum of an output delay value associated with a particular audio output device 104 indicated by the output delay data 122 and a host delay value as indicated by the host delay data 128.

In some circumstances, the output delay data 122 in the memory 114 includes multiple output delay values in the table 124 or in another data structure. To illustrate, the output delay data 122 may include different output delay values for different audio output devices 104, different output delay values for one audio output device 104 that are for use in different situations, or both. In such circumstances, the playback synchronizer 132 selects a particular output delay value to be used from the output delay data 122.

In some circumstances, an audio output device 104 may not provide output delay data 184 to the host device 102 before the playback synchronizer 132 begins determining the synchronization delay. In such circumstances, the playback synchronizer 132 may use a default value 126 of the output delay data 122 to determine the synchronization delay. If the audio output device 104 subsequently provides the output delay data 184 to the host device 102 (e.g., in response to a query from the host device 102 or for some other reason), the output delay data 184 provided by the audio output device 104 is used to update the output delay data 122 stored in the memory 114, and the playback synchronizer 132 updates the synchronization delay based on the updated output delay data 122.

In a particular aspect, the playback synchronizer 132 uses the synchronization delay to facilitate synchronization of audio playback at the audio output device 104 and video playback at the display 140. For example, the playback synchronizer 132 initiates sending of the audio data 154 to the audio output device 104 by providing the audio information 134 to the wireless communication protocol stack 142. Additionally, the playback synchronizer 132 sends the video information 136 to the display; however, the video information 136 is delayed based on the synchronization delay. In the example illustrated in FIG. 1, the playback synchronizer 132 configures a delay buffer 138 (e.g., by setting a depth of the delay buffer 138) such that playback of each video frame is delayed (relative to sending of a corresponding audio frame) by an amount indicated by the synchronization delay.

Thus, playout of each video frame at the display 140 is synchronized or nearly synchronized with playout of audio corresponding to the video frame at the audio output device 104. Further, such synchronization can be achieved even for different operating conditions or different audio output devices 104.

As an example, the host device 102 can receive the first output delay data 184A from the first audio output device 104A and second output delay data 184B from the second audio output device 104B. In this example, the host device 102 stores the first output delay data 184A and the second output delay data 184B in the memory 114 as values in the output delay data 122 (e.g. in the table 124 or in another data structure). In this example, during multimedia playback, the host device 102 sends video to the display 140 and sends audio data 154 to either the first audio output device 104A or the second audio output device 104B. The playback synchronizer 132 selects a particular output delay value from the output delay data 122 based on which of the audio output devices 104 the audio data 154 is sent to. For example, if the audio data 154 is sent to the first audio output device 104A, the playback synchronizer 132 selects an output delay value associated with the first audio output device 104A, and if the audio data 154 is sent to the second audio output device 104B, the playback synchronizer 132 selects an output delay value associated with the second audio output device 104B. The particular output delay value may also be based on other factors, such as an operating mode of the host device 102 or the audio output device 104. The particular audio output device 104 to which the audio data 154 is sent may be determined based on settings of the host device 102, based on which of the audio output devices 104 has an active communications link 106 with the host device 102 when playback is initiated, or based on other factors.

In a particular aspect, the output delay data 184 from a single audio output device 104 can include more than one output delay value, which the host device 102 stores in the memory 114 as values in the output delay data 122 (e.g. in the table 124 or in another data structure). To illustrate, the output delay data 122 can include two or more different output delay values for the first audio output device 104A, two or more different output delay values for the second audio output device 104B, or both. The different output delay values may be associated with different conditions.

As an example, a first output delay value may be associated with use of a first codec (e.g., one of the codec(s) 144) to send the audio data 154 to the audio output device 104, and a second output delay value may be associated with use of a second codec (e.g., another of the codec(s) 144) to send the audio data 154 to the audio output device 104. In this example, the codec(s) 144 can include a set of audio codecs, such as an LDAC® codec, an Advanced Audio Coding (AAC) codec, an SBC codec, an APIX® codec, an APTX-HD codec, etc. (LDAC is a registered trademark of Sony Corporation of Tokyo, Japan, and APTX is a registered trademark of QUALCOMM TECHNOLOGIES INTERNATIONAL, LTD of Cambridge, United Kingdom), and the playback synchronizer 132 can select an output delay value associated with the particular audio codec that is to be used to send the audio data 154. The particular audio codec used to send the audio data 154 may be determined based on settings of the host device 102, based on capabilities of the recipient audio output device 104, or based on other factors.

As another example, a first output delay value may be used when the host device 102 is in a first operating mode and a second output delay value may be used when the host device 102 is in a second operating mode. To illustrate, desynchronization of face and mouth movements may be more noticeable to a user during a video call than desynchronization of sound output while playing a video game; accordingly, a different output delay value may be used for a video call mode than for a gaming mode. As another illustrative example, a video streaming mode of the host device 102 may be associated with a different output delay value than the gaming mode, the video call mode, or both. The operating mode of the host device 102 may be determined based on settings of the host device 102, a type of media being played back; or based on other factors.

As another example, a first output delay value may be used when the audio output device 104 is in a first operating mode and a second output delay value may be used when the audio output device 104 is in a second operating mode. An audio output device 104 may be configured to operate in various modes such as with or without noise cancellation, or with or without audio equalization. Other examples of different operating modes of an audio output device 104 include a stereo mode, a mono mode, and a surround sound mode. The operating mode of the audio output device 104 may, be specified by the host device 102, may be based on the mode switch(es) 182, or may be based on other factors.

As another example; a first output delay value may be used when the communications link 106 between the host device 102 and the audio output device 104 has first signaling characteristics and a second output delay value may be used when the communications link 106 has second signaling characteristics. The signaling characteristics may include a signal-to-noise ratio, a signal strength, a packet loss rate, a data rate, or another characteristic of the quality and/or rate of communications between the host device 102 and the audio output device 104. The signaling characteristics may be determined by a component of the wireless communication protocol stack 142; by a component of the wireless communication protocol stack 156, or both.

In some implementations, combinations of the above examples may be used. For example, the output delay data 122 may include multiple delay parameters that are used to determine an output delay value. To illustrate, the delay parameters may include two or more of: a first value corresponding to a particular codec used to encode the audio data 154; a second value corresponding to a sample rate associated with the audio data 154; a third value corresponding to a bit rate associated with transmission of the audio data 154; or a fourth value corresponding to a delay mode (e.g., an operating mode of the host device 102 or the audio output device 104). In this example, an output delay value used to determine the synchronization delay is based on two or more of the delay parameters.

In some implementations, the host device 102 corresponds to, includes, or is included within one or various types of devices. For example, the processor(s) 112 are integrated in a portable computing device, a game system, a mobile communication device, a tablet computing device, a smart display, or a combination thereof, as illustrative, non-limiting examples. In some implementations, the audio output device(s) 104 corresponds to, includes, or is included within one or various types of devices. For example, the sound transducer(s) 172 are integrated in headphones, one or more ear buds, or one or more speakers, as illustrative, non-limiting examples.

Figure 2:
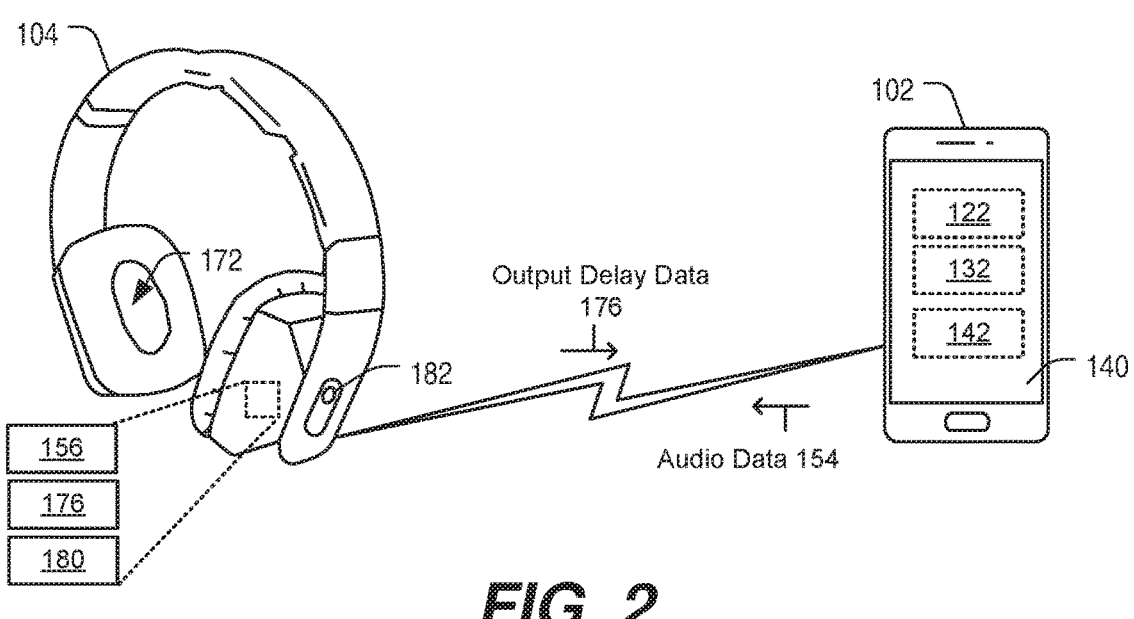
FIG. 2 is a diagram of an illustrative aspect of operation of components of the system of FIG. 1 in accordance with some examples of the present disclosure.

FIG. 2 is a diagram of illustrative aspects of operation of components of the system 100 of FIG. 1 in accordance with some examples of the present disclosure. In FIG. 2, the audio output device 104 includes or corresponds to headphones, and the host device 102 includes or corresponds to a mobile device, such as a smart phone, a portable media player, or a game console. The output delay data 122, the playback synchronizer 132, the wireless communication protocol stack 142, and the display 140 are integrated into the host device 102, where dotted lines are used to indicate internal components (e.g., internal to the host device 102 and positioned behind the display 140) that may not typically be visible during normal operation. Additionally, the wireless communication protocol stack 156, the output delay data 176, the controller 180, the mode switch(es) 182, and the sound transducer(s) 172 are integrated within the audio output device 104.

In the particular example illustrated in FIG. 2, the audio output device 104 provides the output delay data 176 to the audio output device 104. The host device 102 uses the output delay data 176 to synchronize output of media to the display 140 and the sound transducer(s) 172. In some implementations, the particular output delay value(s) provided via the output delay data 176 may depend on a position of the mode switch(es) 182. For example, in a first position, the mode switch(es) 182 activates a noise-cancellation mode, which corresponds to a first value of the output delay data 176, and in a second position, the mode switch(es) 182 deactivates the noise-cancellation mode, which corresponds to a second value of the output delay data 176. As another example, in a first position, the mode switch(es) 182 activates a mono output mode, which corresponds to a first value of the output delay data 176; in a second position, the mode switch(es) 182 activates a stereo output mode, which corresponds to a second value of the output delay data 176; and in a third position, the mode switch(es) 182 activates a surround output mode, which corresponds to a third value of the output delay data 176. In other examples, the mode switch(es) 182 activates or de-activates an equalizer, or another audio processing function. Thus, the particular value or values of the output delay data 176 may be selected based on the mode switch(es) 182.

Figure 3:
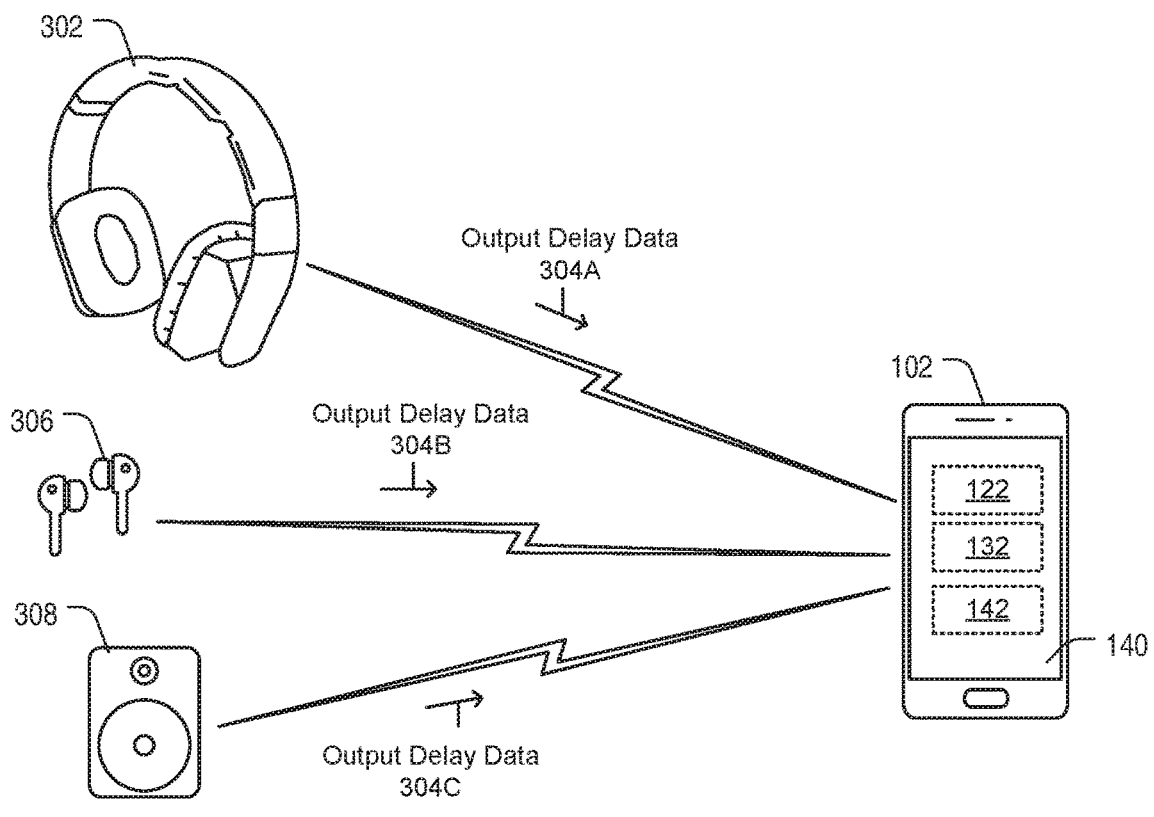
FIG. 3 is a diagram of another illustrative aspect of operation of components of the system of FIG. 1 in accordance with some examples of the present disclosure.

FIG. 3 is a diagram of illustrative aspects of operation of components of the system 100 of FIG. 1 in accordance with some examples of the present disclosure. In FIG. 3, the host device 102 includes or corresponds to a mobile device, such as a smart phone, a portable media player, or a game console. The host device 102 is configured to communicate with a plurality of distinct audio output devices, including headphones 302, earbuds 306, and a speaker 308. Each of the audio output devices is configured to provide output delay data to the host device 102. To illustrate, the headphones 302 provide output delay data 304A, the earbuds 306 provide output delay data 304B, and the speaker 308 provides output delay data 304C. The host device 102 uses different output delay data 122 depending on which of the audio output devices the host device 102 is sending audio data to. For example, when synchronizing output of video to the display 140 and audio to the headphones 302, the playback synchronizer 132 uses one or more values from the output delay data 304A. Further, when synchronizing output of video to the display 140 and audio to the earbuds 304, the playback synchronizer 132 uses one or more values from the output delay data 304B.

Figure 4:
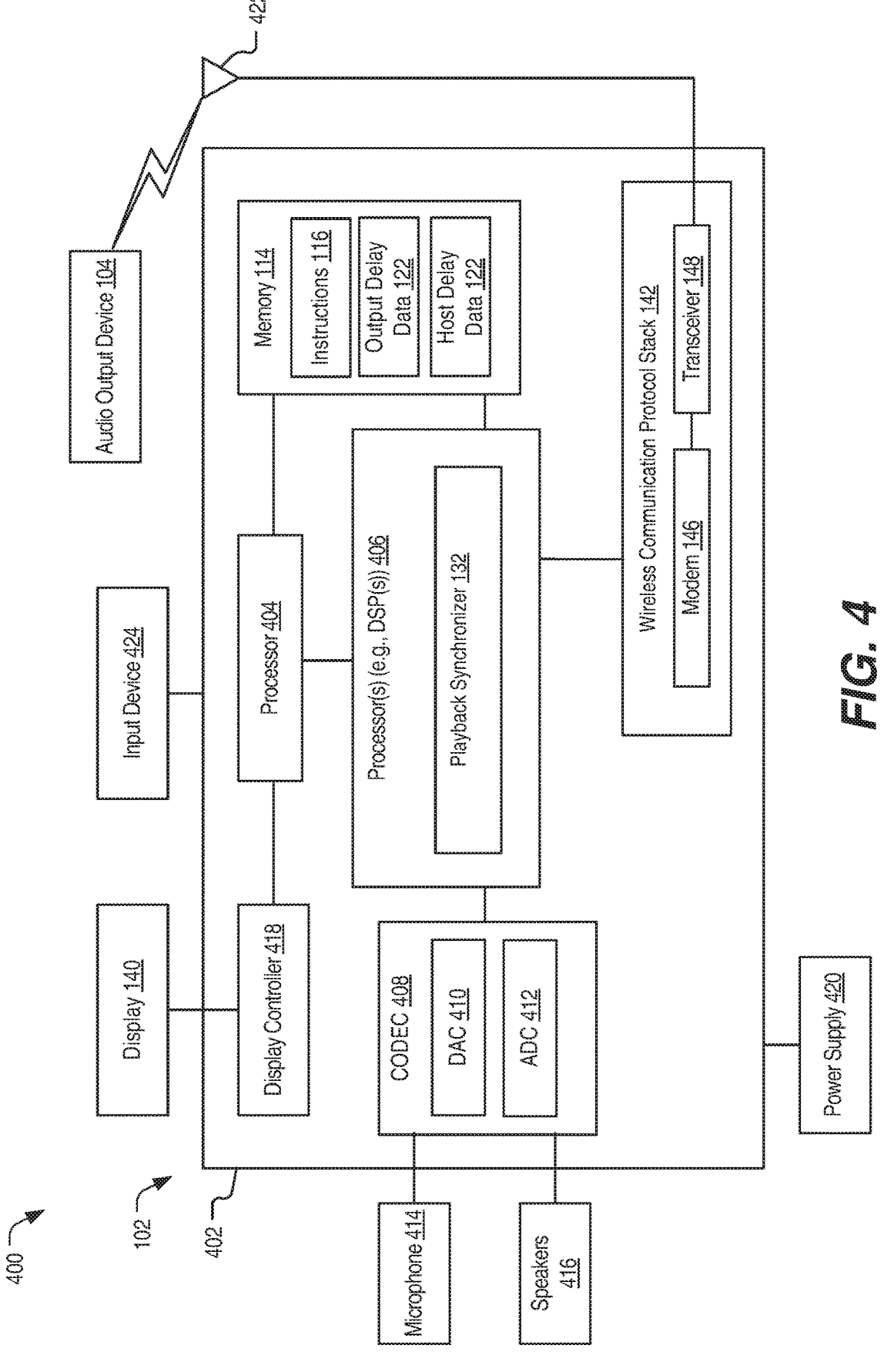
FIG. 4 is a block diagram of a particular illustrative example of a device that is operable to synchronize audio and video during multimedia playback in accordance with some examples of the present disclosure.

Referring to FIG. 4, a block diagram of a system 400 including a particular illustrative implementation of the host device 102 is shown. In various implementations, the host device 102 may have more or fewer components than illustrated in FIG. 4. In an illustrative implementation, the host device 102 may perform one or more operations described with reference to FIGS. 1-3 or FIGS. 5-15.

In a particular implementation, the host device 102 includes a processor 404 (e.g., a central processing unit (CPU)). The device 102 may include one or more additional processors 406 (e.g., one or more DSPs). In a particular aspect, the processor 112 of FIG. 1 corresponds to the processor 404, the processors 406, or a combination thereof. The processors 406 may include the playback synchronizer 132.

The host device 102 may include the memory 114 and a CODEC 408. The memory 114 may include the instructions 116, that are executable by the one or more additional processors 406 (or the processor 404) to implement functionality described with reference to FIGS. 1-3 or FIGS. 5-15. The host device 102 may include the wireless communication protocol stack 142. The wireless communication protocol stack 142 includes the modem 146 coupled, via the transceiver 148, to an antenna 422.

The host device 102 may include the display 140 coupled to a display controller 418. One or more speakers 416 and one or more microphones 414 may be coupled to the CODEC 408. The CODEC 408 may include a digital-to-analog converter (DAC) 410, an analog-to-digital converter (ADC) 412, or both. In a particular implementation, the CODEC 408 may receive analog signals from the microphone(s) 414, convert the analog signals to digital signals using the analog-to-digital converter 412, and provide the digital signals to the processors 406. In a particular implementation, the processors 406 may provide digital signals to the CODEC 408. The CODEC 408 may convert the digital signals to analog signals using the digital-to-analog converter 410 and may provide the analog signals to the speaker(s) 416.

In a particular implementation, the host device 102 may be included in a system-in-package or system-on-chip device 402 (e.g., one or more integrated circuits). In a particular implementation, the memory 114, the processor 404, the processors 406, the display controller 418, the CODEC 408, and the modem 146 are included in the system-in-package or system-on-chip device 402. In a particular implementation, an input device 424 and a power supply 420 are coupled to the system-on-chip device 402. Moreover, in a particular implementation, as illustrated in FIG. 4, the display 140, the input device 424, the speaker 416, the microphone 414, the antenna 422, and the power supply 420 are external to the system-on-chip device 402. In a particular implementation, each of the display 140, the input device 424, the speaker 416, the microphone 414, the antenna 422, and the power supply 420 may be coupled to a component of the system-on-chip device 402, such as an interface or a controller.

The host device 102 may include, correspond to, or be integrated within a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a headset, an augmented reality headset, a virtual reality headset, a portable electronic device, a car, a vehicle, a computing device, an internet-of-things (loT) device, a virtual reality (VR) device, a mobile device, or any combination thereof. The host device 102 may communicate with the audio output device 104, such as via a wireless peer-to-peer ad hoc connection. For example, the audio output device 104 may send output delay data to the host device 102 via the wireless peer-to-peer ad hoc connection, and the host device 102 may send audio data to the audio output device 104 via the wireless peer-to-peer ad hoc connection. The audio output device 104 may include, correspond to, or be integrated within a smart speaker, a speaker bar, a wireless speaker, headphones, earbud, or another audio output device.

Figure 5:
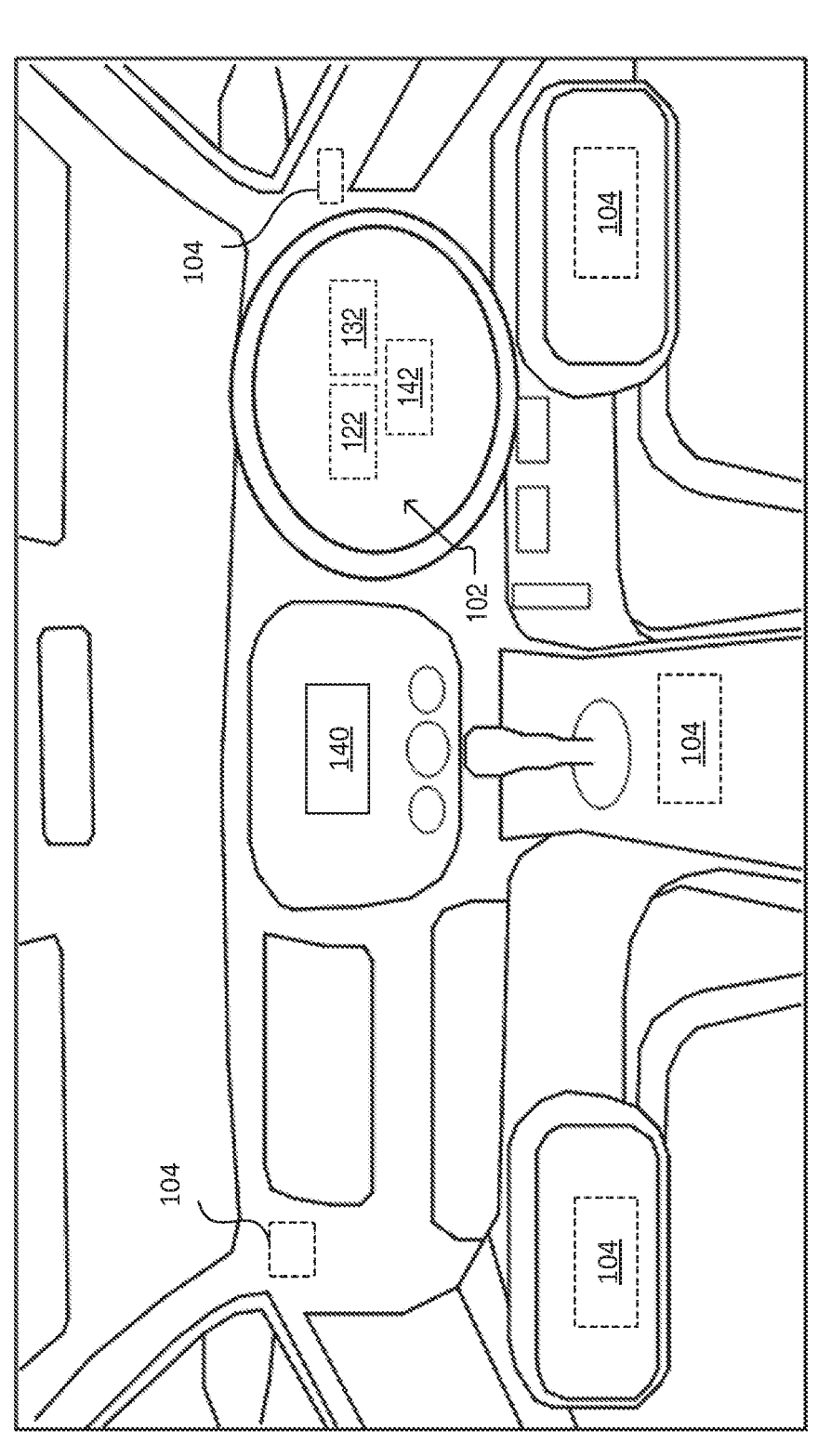
FIG. 5 is a diagram of an example of a vehicle operable to synchronize audio and video during multimedia playback in accordance with some examples of the present disclosure.

FIG. 5 depicts another implementation 500 in which the host device 102 corresponds to, or is integrated within, a vehicle 500, illustrated as a car, and the audio output device 104 includes or is coupled to one or more speakers of the vehicle 500. In FIG. 5, the host device 102 includes the output delay data 122, the playback synchronizer 132, the wireless communication protocol stack 142, and the display 140. In a particular example, the audio output device 104 provides output delay data via a wireless peer-to-peer communications link to the host device 102 to facilitate synchronization of video output at the display 140 and audio output by the audio output device(s) 104.

Figure 6:
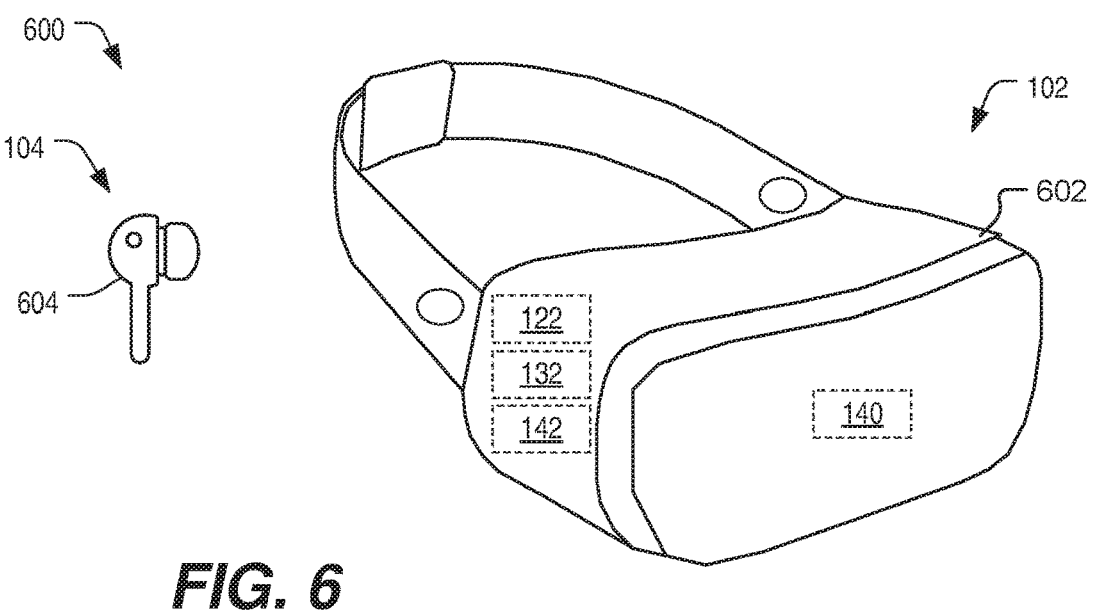
FIG. 6 is a diagram of a headset operable to synchronize audio and video during multimedia playback in accordance with some examples of the present disclosure.

FIG. 6 depicts an implementation 600 in which the host device 102 includes a portable electronic device that corresponds to a virtual reality-, augmented reality, or mixed reality headset 602, and the audio output device 104 includes wireless earbuds 604. In FIG. 6, the output delay data 122, the playback synchronizer 132, the wireless communication protocol stack 142, and the display 140 are integrated into the headset 602. In a particular example, the wireless earbuds 604 provide output delay data to the headset via a wireless peer-to-peer communications link to facilitate synchronization of video output at the display 140 and audio output by the wireless earbuds 604.

Figure 7:
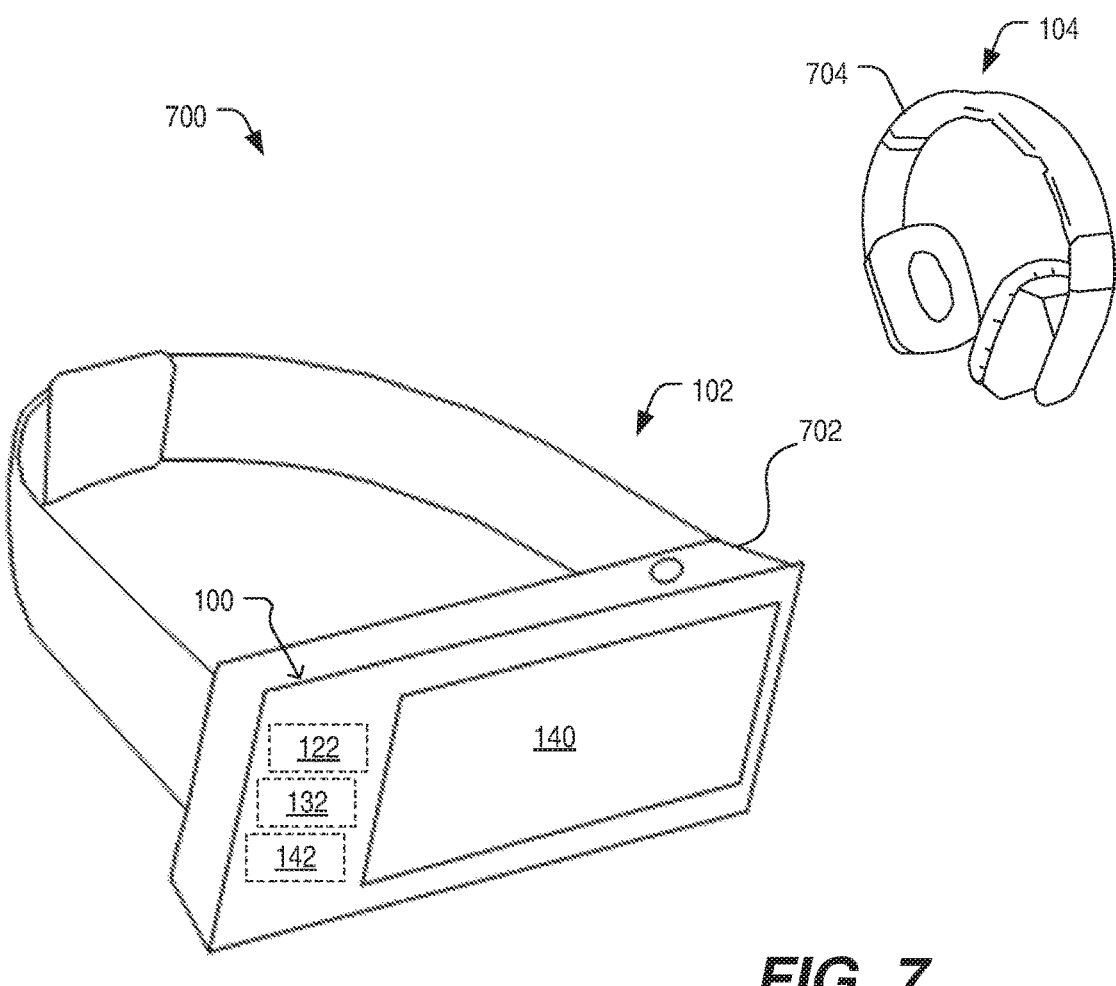
FIG. 7 is a diagram of a wearable electronic device operable to synchronize audio and video during multimedia playback in accordance with some examples of the present disclosure.

FIG. 7 depicts an implementation 700 in which the host device 102 includes a wearable electronic device 702, illustrated as a "smart watch," and the audio output device 104 includes headphones 704. In FIG. 7, the output delay data 122, the playback synchronizer 132, the wireless communication protocol stack 142, and the display 140 are integrated into the wearable electronic device 702. In a particular example, the headphones 704 provide output delay data to the wearable electronic device 702 via a wireless peer-to-peer communications link to facilitate synchronization of video output at the display 140 and audio output by the headphones 704.

FIG. 8 is a diagram of a particular implementation of a method 800 of synchronizing audio and video during multimedia playback that may be performed by the host device 102 of FIG. 1 in accordance with some examples of the present disclosure. The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by the processor(s) 112 executing the instructions 116.

The method 800 includes, at block 802, obtaining, at a host device from an audio output device, output delay data indicating a playback delay associated with audio output by the audio output device. For example, the host device 102 of FIG. 1 receives the first output delay data 184A from the first audio output device 104A. The first output delay data 1841 indicates one or more output delay values associated with the first audio output device 104A.

The method 800 also includes, at block 804, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122. In this example, the output delay data 122 includes or corresponds to the first output delay data 184A from the first audio output device 104A.

The method 800 further includes, at block 806, during multimedia playback by the host device, sending audio data from the host device to the audio output device and sending video data to the display, where the video data is delayed, based on the synchronization delay, relative to the sending of the audio data. For example, the player 130 of the host device 102 sends the audio information 134 to the wireless communication protocol stack 142 and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 9 is a diagram of a particular implementation of a method 900 of synchronizing audio and video during multimedia playback that may be performed by the host device 102 of FIG. 1 in accordance with some examples of the present disclosure. The method 900 of FIG. 9 may be implemented by an FPGA device, an ASIC, a processing unit such as a CPU, a DSP, a controller, another hardware device, firmware device, or any combination thereof. As an example, the method 900 of FIG. 9 may be performed by the processor(s) 112 executing the instructions 116.

The method 900 includes, at block 902, obtaining output delay data from an audio output device during configuration of a wireless communication connection between the host device and the audio output device. For example, the host device 102 of FIG. 1 receives the first output delay data 184A from the first audio output device 104A during configuration of the first communications link 106A, such as during a handshake data exchange to establish the first communications link 106A. The first output delay data 184A indicates one or more output delay values associated with the first audio output device 104A.

The method 900 also includes, at block 904, storing the output delay data at a memory of the host device for use during a subsequent communication session associated with the multimedia playback. For example, the host device 102 of FIG. 1 stores values from the first output delay data 184A at the memory 114, such as in the table 124 or other data structure of the output delay data 122.

The method 900 also includes, at block 906, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122 stored in the memory 114.

The method 900 further includes, at block 908, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142 and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display 140 by an amount that is based on the synchronization delay.

FIG. 10 is a diagram of a particular implementation of a method 1000 of synchronizing audio and video during multimedia playback that may be performed by the host device 102 of FIG. 1 in accordance with some examples of the present disclosure. The method 1000 of FIG. 10 may be implemented by an FPGA device, an ASIC, a processing unit such as a CPU, a DSP, a controller, another hardware device, firmware device, or any combination thereof. As an example, the method 1000 of FIG. may be performed by the processor(s) 112 executing the instructions 116.

The method 1000 includes, at block 1002, storing, at a memory of a host device, first output delay data for a first audio output device and second output delay data for a second audio output device, where the first output delay data is different from the second output delay data. For example, the host device 102 of FIG. 1 stores values from the first output delay data 184A and values from the second output delay data 184B at the memory 114, such as in the table 124 or other data structure of the output delay data 122. Due to different configurations, capabilities, or other differences between the first audio output device 104A and the second audio output device 104B, audio data 154 sent to the first audio output device 104A may experience a different output delay than audio data 154 sent to the second audio output device 104B. Accordingly, the first output delay data 184A may be different from the second output delay data 184B. In a particular aspect, the values from the first output delay data 184A and values from the second output delay data 184B may be stored in association with information indicating with which audio output device 104 each value is associated. To illustrate, each of the values may be stored in the table 124 in conjunction with an identifier of the audio output device 104 with which the value is associated.

The method 1000 includes, at block 1004, during operations to establish a communications session between the host device and an audio output device, receiving an identifier of the audio output device at the host device. For example, while establishing the first communications link 106A, or after establishing the first communications link 106A and during set up of a particular multimedia playback session, the host device 102 may receive information specifying to which of the audio output devices 104 the audio data 154 is to be sent. The information specifying to which of the audio output devices 104 the audio data 154 is to be sent may include an identifier of the audio output device 104.

The method 1000 includes, at block 1006, obtaining output delay data indicating a playback delay associated with audio output by the audio output device. The output delay data is obtained from the memory based on the identifier of the audio output device. For example, the host device 102 of FIG. 1 may look up one or more values of the output delay data 122 in the memory 114 based on the identifier of the audio output device 104 to which the audio data 154 is to be sent.

The method 1000 also includes, at block 1008, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122. In this example, the output delay data 122 includes or corresponds to the first output delay data 184A from the first audio output device 104A.

The method 1000 further includes, at block 1010, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142, and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 11 is a diagram of a particular implementation of a method 1100 of synchronizing audio and video during multimedia playback that may be performed by the host device 102 of FIG. 1 in accordance with some examples of the present disclosure. The method 1100 of FIG. 11 may be implemented by an FPGA device, an ASIC, a processing unit such as a CPU, a DSP, a controller, another hardware device, firmware device, or any combination thereof. As an example, the method 1100 of FIG. 11 may be performed by the processor(s) 112 executing the instructions 116.

The method 1100 includes, at block 1102, obtaining, at a host device from an audio output device, output delay data indicating a playback delay associated with audio output by the audio output device, where the output delay data includes multiple playback delay values corresponding to different operating conditions. For example, the host device 102 of FIG. 1 receives the first output delay data 184A from the first audio output device 104A. In this example, the first output delay data 184A may include multiple playback delay values corresponding to different operating conditions associated with the first audio output device 104A. To illustrate, the first output delay data 184A may include a first playback delay value associated with using a first codec and a second playback delay value associated with using a second codec. As another illustrative example, the first output delay data 184A may include a first playback delay value associated with a mono sound output mode, a second playback delay value associated with using a stereo sound output mode, and a third playback delay value associated with using a surround sound output mode. As another illustrative example, the first output delay data 184A may include a first playback delay value associated with using noise cancellation and a second playback delay value associated with not using noise cancellation. As another illustrative example, the first output delay data 184A may include a first playback delay value associated with using a power saving mode and a second playback delay value associated with not using the power saving mode. As still another illustrative example, the first output delay data 184A may include a first playback delay value associated with using an equalization function and a second playback delay value associated with not using the equalization function. As yet another illustrative example, the first output delay data 184A may include a first playback delay value associated with a first signaling characteristic of the first communications link 106A and a second playback delay value associated with a second signaling characteristic of the first communications link 106I. As another illustrative example, the first output delay data 184A may include a first playback delay value associated with media output in a video call mode, a second playback delay value associated with media output in a media streaming mode, and a third playback delay value associated with media output in a gaming mode.

The method 1100 includes, at block 1104, selecting, based on an operating condition associated with multimedia playback, a particular value of the multiple playback delay values to determine the synchronization delay. For example, the playback synchronizer 132 may determine a set of operating conditions based on settings associated with the host device 102, based on settings associated with the audio output device 104, based on detecting operating conditions, or based on other factors. In this example, the playback synchronizer 132 may select a particular output delay value from the output delay data 122 based on the set of operating conditions.

The method 1100 also includes, at block 1106, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the selected output delay value(s) of the output delay data 122.

The method 1100 further includes, at block 1108, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142 and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 12 is a diagram of a particular implementation of a method 1200 of synchronizing audio and video during multimedia playback that may be performed by the host device 102 of FIG. 1 in accordance with some examples of the present disclosure. The method 1200 of FIG. 12 may be implemented by an FPGA device, an ASIC, a processing unit such as a CPU, a DSP, a controller, another hardware device, firmware device, or any combination thereof. As an example, the method 1200 of FIG. 12 may be performed by the processor(s) 112 executing the instructions 116.

The method 1200 includes, at block 1202, sending a query from a host device to an audio output device. For example, the host device 102 may send a query to the first audio output device 104A via the first communications link 106A. To illustrate, the host device 102 may periodically (e.g., according to a schedule) or occasionally (e.g., in response to detecting a trigger event) send queries to the audio output device(s) 104 to gather or update the output delay data 122.

The method 1200 includes, at block 1204, obtaining, at the host device from the audio output device responsive to the query. The output delay data indicates a playback delay associated with audio output by the audio output device. For example, the host device 102 of FIG. 1 may receive the first output delay data 184A from the first audio output device 104A in response to a query from the host device 102. The first output delay data 184A indicates one or more output delay values associated with the first audio output device 104A.

The method 1200 also includes, at block 1206, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122. In this example, the output delay data 122 includes or corresponds to the first output delay data 184A from the first audio output device 104A.

The method 1200 further includes, at block 1208, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142, and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 13 is a diagram of a particular implementation of a method 1300 of synchronizing audio and video during multimedia playback that may be performed by the host device 102 of FIG. 1 in accordance with some examples of the present disclosure. The method 1300 of FIG. 13 may be implemented by an FPGA device, an ASIC, a processing unit such as a CPU, a DSP, a controller, another hardware device, firmware device, or any combination thereof. As an example, the method 1300 of FIG. 13 may be performed by the processor(s) 112 executing the instructions 116.

The method 1300 includes, at block 1302, receiving input at a host device indicating desynchronization of multimedia playback. For example, a user may provide input to the host device 102 of FIG. 1 to indicate that video output by the display and audio output by the first audio output device 104A are not synchronized.

The method 1300 includes, at block 1304, obtaining, at the host device based on the input indicating desynchronization of the multimedia playback, output delay data indicating a playback delay associated with audio output by the audio output device. For example, the host device 102 may send a query to the first audio output device 104A in response to receiving the input indicating desynchronization of the multimedia playback during a multimedia playback session in which the first audio output device 104A is providing audio output. In this example, in response to the query, the first audio output device 104A may send updated values of the first output delay data 184A to the host device 102.

The method 1300 also includes, at block 1306, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122. In this example, the output delay data 122 includes or corresponds to the first output delay data 184A from the first audio output device 104A.

The method 1300 further includes, at block 1308, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142 and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 14 is a diagram of a particular implementation of a method 1400 of synchronizing audio and video during multimedia playback that may be performed by the host device 102 of FIG. 1 in accordance with some examples of the present disclosure. The method 1400 of FIG. 14 may be implemented by an FPGA device, an ASIC, a processing unit such as a CPU, a DSP, a controller, another hardware device, firmware device, or any combination thereof. As an example, the method 1400 of FIG. 14 may be performed by the processor(s) 112 executing the instructions 116.

The method 1400 includes, at block 1402, detecting a trigger event. For example, the host device 102 may detect a trigger event based on a change of operating mode of the host device, a change of operating mode of the audio output device, a signaling characteristic between the host device 102 and the audio output device 104, or other factors.

The method 1400 includes, at block 1404, obtaining, at a host device from an audio output device responsive to detecting the trigger event, output delay data. The output delay data indicates a playback delay associated with audio output by the audio output device. For example, the host device 102 of FIG. 1 may receive the first output delay data 184A from the first audio output device 104A in response to a query sent based on detecting the trigger event. As another example, the host device 102 of FIG. 1 may look up a value from the output delay data 122 in response to detecting the trigger event.

The method 1400 also includes, at block 1406, determining, at the host device based on the output delay data and host delay data, a synchronization delay to coordinate audio output by the audio output device and video output by a display of the host device. For example, the playback synchronizer 132 of the host device 102 determines the synchronization delay based on the host delay data 128 and the output delay data 122. In this example, the output delay data 122 includes or corresponds to the first output delay data 184A from the first audio output device 104A.

The method 1400 further includes, at block 1408, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142, and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 15 is a diagram of a particular implementation of a method 1500 of synchronizing audio and video during multimedia playback that may be performed by the host device 102 of FIG. 1 in accordance with some examples of the present disclosure. The method 1500 of FIG. 15 may be implemented by an FPGA device, an ASIC, a processing unit such as a CPU, a DSP, a controller, another hardware device, firmware device, or any combination thereof. As an example, the method 1500 of FIG. 15 may be performed by the processor(s) 112 executing the instructions 116.

The method 1500 includes, at block 1502, obtaining, at a host device from an audio output device, output delay data indicating a playback delay associated with audio output by the audio output device. For example, the host device 102 of FIG. 1 receives the first output delay data 184A from the first audio output device 104A. The first output delay data 184A indicates one or more output delay values associated with the first audio output device 104A.

The method 1500 also includes, at block 1504, obtaining from the output delay data delay parameters corresponding to at least two of: a first value corresponding to a particular codec used to encode the audio data; a second value corresponding to a sample rate associated with the audio data; a third value corresponding to a bit rate associated with transmission of the audio data; or a fourth value corresponding to a delay mode. The method 1500 also includes, at block 1506, determining, at the host device based on the output delay data and host delay data, a synchronization delay to coordinate audio output by the audio output device and video output by a display of the host device. For example, the synchronization delay may be determined based on one or more of the first value, the second value, the third value, or the fourth value.

The method 1500 further includes, at block 1508, during multimedia playback by the host device, sending audio data from the host device to the audio output device and sending video data to the display, where the video data is delayed, based on the synchronization delay, relative to the sending of the audio data. For example, the media player 130 of the host device 102 sends the audio information 134 to the wireless communication protocol stack 142, and the wireless communication protocol stack 142 sends the audio data 154 (based on the audio information 134) to the first audio output device 104A via the first communications link 106A. The playback synchronizer 132 causes the media player 130 to delay sending the video information 136 corresponding to the audio information 134 to the display by an amount that is based on the synchronization delay.

FIG. 16 is a diagram of a particular implementation of a method 1600 of synchronizing audio and video during multimedia playback that may be performed by one of the audio output devices 104 of FIG. 1 in accordance with some examples of the present disclosure. The method 1600 of FIG. 16 may be implemented by an FPGA device, an ASIC, a processing unit such as a CPU, a DSP, a controller, another hardware device, firmware device, or any combination thereof. As an example, the method 1600 of FIG. 16 may be performed by the controller 180 executing instructions stored in the memory 174.

The method 1600 includes, at block 1602, storing, at a memory of an audio output device, output delay data indicating a playback delay associated with audio output by the audio output device. For example, the first audio output device 104A of FIG. 1 stores the output delay data 176 at the memory 174. In this example, the output delay data 176 indicates playback delay associated with the first audio output device 104A.

The method 1600 also includes, at block 1604, sending the output delay data to a host device to enable the host device to determine a synchronization delay to coordinate audio output by the audio output device and video output by a display device. For example, the first audio output device 104A of FIG. 1 sends the first output delay data 184A to the host device 102 via the first communications link 106A. In this example, the first output delay data 184A includes the output delay data 176 or a portion thereof, such as one or more selected output delay values of the output delay data 176.

FIG. 17 is a diagram of a particular implementation of a method 1700 of synchronizing audio and video during multimedia playback that may be performed by one of the audio output devices 104 of FIG. 1 in accordance with some examples of the present disclosure. The method 1700 of FIG. 17 may be implemented by an FPGA device, an ASIC, a processing unit such as a CPU, a DSP, a controller, another hardware device, firmware device, or any combination thereof. As an example, the method 1700 of FIG. 17 may be performed by the controller 180 executing instructions stored in the memory 174.

The method 1700 includes, at block 1702, establishing, at an audio output device, a wireless peer-to-peer ad hoc connection with a host device. For example, the first audio output device 104A may perform a data exchange with the host device 102 to establish the first communications link 106A. In this example, the first communications link 106A may correspond to a wireless peer-to-peer ad hoc connection, such as a connection that conforms to a BLUETOOTH® protocol specification (BLUETOOTH is a registered trademark of BLUETOOTH SIG, INC. of Kirkland, Washington, USA), a connection that conforms to an IEEE® protocol specification (IEEE is a registered trademark of The Institute of Electrical and Electronics Engineers, Inc. Piscataway New Jersey, USA), a connection that conforms to a proprietary protocol, or another wireless peer-to-peer ad hoc connection.

The method 1700 also includes, at block 1704, storing, at a memory of an audio output device, output delay data indicating a playback delay associated with audio output by the audio output device. For example, the first audio output device 104A of FIG. 1 stores the output delay data 176 at the memory 174. In this example, the output delay data 176 indicates playback delay associated with the first audio output device 104A.

The method 1700 also includes, at block 1706, sending the output delay data to the host device via the wireless peer-to-peer ad hoc connection to enable the host device to determine a synchronization delay to coordinate audio output by the audio output device and video output by a display device. For example, the first audio output device 104A of FIG. 1 sends the first output delay data 184A to the host device 102 via the first communications link 106A. In this example, the first output delay data 184A includes the output delay data 176 or a portion thereof, such as one or more selected output delay values of the output delay data 176.

FIG. 18 is a diagram of a particular implementation of a method 1800 of synchronizing audio and video during multimedia playback that may be performed by one of the audio output devices 104 of FIG. 1 in accordance with some examples of the present disclosure. The method 1800 of FIG. 18 may be implemented by an FPGA device, an ASIC, a processing unit such as a CPU, a DSP, a controller, another hardware device, firmware device, or any combination thereof. As an example, the method 1800 of FIG. 18 may be performed by the controller 180 executing instructions stored in the memory 174.

The method 1800 includes, at block 1802, storing, at a memory of an audio output device, output delay data indicating a playback delay associated with audio output by the audio output device. The output delay data includes multiple playback delay values corresponding to different operating conditions. For example, the first audio output device 104A of FIG. 1 stores the output delay data 176 at the memory 174. In this example, the output delay data 176 includes multiple playback delay values corresponding to different operating conditions. To illustrate, the output delay data 176 may include a first playback delay value associated with using a first codec and a second playback delay value associated with using a second codec. As another illustrative example, the output delay data 176 may include a first playback delay value associated with using a mono sound output mode, a second playback delay value associated with using a stereo sound output mode, and a third playback delay value associated with using a surround sound output mode. As another illustrative example, the output delay data 176 may include a first playback delay value associated with using noise cancellation and a second playback delay value associated with not using noise cancellation. As still another illustrative example, the output delay data 176 may include a first playback delay value associated with using an equalization function and a second playback delay value associated with not using the equalization function. As yet another illustrative example, the output delay data 176 may include a first playback delay value associated with a first signaling characteristic of the first communications link 106A and a second playback delay value associated with a second signaling characteristic of the first communications link 106A. As another illustrative example, the output delay data 176 may include a first playback delay value associated with media output in a video call mode, a second playback delay value associated with media output in a media streaming mode, and a third playback delay value associated with media output in a gaming mode.

The method 1800 also includes, at block 1804, detecting an operating condition or a change of operating conditions. For example, the first audio output device 104A may detect a change in the signaling characteristics associated with the first communications link 106A. As another example, the first audio output device 104A may detect a change in the operating condition based on the mode switch(es) 182. As yet another example, the first audio output device 104A may receive data from the host device 102 indicating a change of the operating condition of the host device 102.

The method 1800 also includes, at block 1806, selecting, based on the detected operating condition or change of operating conditions, a particular value of the multiple playback delay values. For example, the controller 180 of the first audio output device 104A may select a particular value from the output delay data 176.

The method 1800 also includes, at block 1808, sending at least the particular value of the output delay data to the host device to enable the host device to determine a synchronization delay to coordinate audio output by the audio output device and video output by a display device. For example, the first audio output device 104A of FIG. 1 sends the first output delay data 184A to the host device 102 via the first communications link 106A. In this example, the first output delay data 184A includes the output delay data 176 or a portion thereof, such as one or more selected output delay values of the output delay data 176.

FIG. 19 is a diagram of a particular implementation of a method 1900 of synchronizing audio and video during multimedia playback that may be performed by one of the audio output devices 104 of FIG. 1 in accordance with some examples of the present disclosure. The method 1900 of FIG. 19 may be implemented by an FPGA device, an ASIC, a processing unit such as a CPU, a DSP, a controller, another hardware device, firmware device, or any combination thereof. As an example, the method 1900 of FIG. 19 may be performed by the controller 180 executing instructions stored in the memory 174.

The method 1900 includes, at block 1902, storing, at a memory of an audio output device, output delay data indicating a playback delay associated with audio output by the audio output device. For example, the first audio output device 104A of FIG. 1 stores the output delay data 176 at the memory 174. In this example, the output delay data 176 indicates playback delay associated with the first audio output device 104A.

The method 1900 also includes, at block 1904, receiving, at the audio output device, a query from a host device. For example, the host device 102 of FIG. 1 may send a query for output delay data to the first audio output device 104A via the first communications link 106A.

The method 1900 also includes, at block 1906, sending the output delay data to the host device responsive to the query to enable the host device to determine a synchronization delay to coordinate audio output by the audio output device and video output by a display device. For example, the first audio output device 104A of FIG. 1 sends the first output delay data 184A to the host device 102 via the first communications link 106A in response to receiving a query from the host device 102. In this example, the first output delay data 184A includes the output delay data 176 or a portion thereof, such as one or more selected output delay values of the output delay data 176.

FIG. 20 is a diagram of a particular implementation of a method 2000 of synchronizing audio and video during multimedia playback that may be performed by one of the audio output devices 104 of FIG. 1 in accordance with some examples of the present disclosure. The method 2000 of FIG. 20 may be implemented by an FPGA device, an ASIC, a processing unit such as a CPU, a DSP, a controller, another hardware device, firmware device, or any combination thereof. As an example, the method 2000 of FIG. 20 may be performed by the controller 180 executing instructions stored in the memory 174.

The method 2000 includes, at block 2002, storing, at a memory of an audio output device, output delay data indicating a playback delay associated with audio output by the audio output device. For example, the first audio output device 104A of FIG. 1 stores the output delay data 176 at the memory 174. In this example, the output delay data 176 indicates playback delay associated with the first audio output device 104A.

The method 2000 also includes, at block 2004, detecting a trigger event. For example, the first audio output device 104a of FIG. 1 may detect a trigger event based on a change of operating mode of the host device, a change of operating mode of the audio output device, a signaling characteristic between the host device 102 and the audio output device 104, or other factors The method 2000 also includes, at block 2006, responsive to detecting the trigger event, sending the output delay data to the host device to enable the host device to determine a synchronization delay to coordinate audio output by the audio output device and video output by a display device. For example, the first audio output device 104A of FIG. 1 sends the first output delay data 184A to the host device 102 via the first communications link 106A in response to detecting the trigger event. In this example, the first output delay data 184A includes the output delay data 176 or a portion thereof, such as one or more selected output delay values of the output delay data 176.

FIG. 21 is a diagram of a particular implementation of a method 2100 of synchronizing audio and video during multimedia playback that may be performed by one of the audio output devices 104 of FIG. 1 in accordance with some examples of the present disclosure. The method 2100 of FIG. 21 may be implemented by an FPGA device, an ASIC, a processing unit such as a CPU, a DSP, a controller, another hardware device, firmware device, or any combination thereof. As an example, the method 2100 of FIG. 21 may be performed by the controller 180 executing instructions stored in the memory 174.

The method 2100 includes, at block 2102, storing, at a memory of an audio output device, output delay data indicating a playback delay associated with audio output by the audio output device. For example, the first audio output device 104A of FIG. 1 stores the output delay data 176 at the memory 174. In this example, the output delay data 176 indicates playback delay associated with the first audio output device 104A.

The method 2100 also includes, at block 2104, sending the output delay data to a host device to enable the host device to determine a synchronization delay to coordinate audio output by the audio output device and video output by a display device. For example, the first audio output device 104A of FIG. 1 sends the first output delay data 184A to the host device 102 via the first communications link 106A. In this example, the first output delay data 184A includes the output delay data 176 or a portion thereof, such as one or more selected output delay values of the output delay data 176.

The method 2100 also includes, at block 2106, receiving audio data from the host device via a wireless transmission. For example, the first audio output device 104A of FIG. 1 may receive the audio data 154 via the first communications link 106A from the host device 102.

The method 2100 also includes, at block 2108, generating the audio output based on the audio data. For example, the wireless communication protocol stack 156 of the first audio output device 104A may provide the audio signals 170, via the audio driver 168, to the sound transducer 172. In this example, the sound transducer 172 generates the audio output based on the audio signals 170.

In conjunction with the described implementations, an apparatus includes means for sending audio data to an audio output device. For example, the means for sending audio data to an audio output device can correspond to the host device 102, the processor(s) 112, the media player 130, the playback synchronizer 132, the wireless communication protocol stack 142, the transceiver 148, the transmitter 150, the processor 404, the processor(s) 406, the antenna 422, one or more other circuits or components configured to send audio data to an audio output device, or any combination thereof.

The apparatus also includes means for receiving, via a transmission from the audio output device, output delay data indicating a playback delay associated with audio output by the audio output device. The means for receiving the output delay data can correspond to the host device 102, the processor(s) 112, the media player 130, the playback synchronizer 132, the wireless communication protocol stack 142, the transceiver 148, the receiver 152, the processor 404, the processor(s) 406, the antenna. 422, one or more other circuits or components configured to receive the output delay data, or any combination thereof.

The apparatus also includes means for determining, based on the output delay data and host delay data, a synchronization delay to coordinate audio output by the audio output device and video output at a display and to delay sending video data. The means for determining the synchronization delay can correspond to the host device 102, the processor(s) 112, the media player 130, the playback synchronizer 132, the processor 404, the processor(s) 406, one or more other circuits or components configured to determine the synchronization delay, or any combination thereof.

The apparatus also includes means for sending video data to the display and causing the transmitter to send the audio data to the audio output device, wherein the video data is delayed, based on the synchronization delay, relative to the sending of the audio data. The means for sending video data to the display and causing the transmitter to send the audio data to the audio output device can correspond to the host device 102, the processor(s) 112, the media player 130, the playback synchronizer 132, the wireless communication protocol stack 142, the transceiver 148, the transmitter 150, the processor 404, the processor(s) 406, the display controller 418, one or more other circuits or components configured to send the video data to the display and cause the transmitter to send the audio data to the audio output device, or any combination thereof.

In some implementations, the apparatus also includes means for storing first output delay data for a first audio output device and second output delay data for a second audio output device. The means for storing the first output delay data and the second output delay data can correspond to the host device 102, the processor(s) 112, the memory 114, one or more other circuits or components configured to store the output delay data, or any combination thereof.

In conjunction with the described implementations, an apparatus includes means for receiving signals encoding audio data from a host device. For example, the means for receiving signals encoding audio data can correspond to one of the audio output devices 104, the controller 180, the wireless communication protocol stack 156, the transceiver 158, the receiver 162, one or more other circuits or components configured to receive signals encoding audio data from a host device, or any combination thereof.

The apparatus also includes means for decoding the signals to generate audio signals based on the audio data. For example, the means for decoding the signals to generate audio signals based on the audio data can correspond to one of the audio output devices 104, the controller 180, the wireless communication protocol stack 156, the transceiver 158, the receiver 162, the codec(s) 166, the modem 164, one or more other circuits or components configured to decode the signals to generate audio signals based on the audio data, or any combination thereof.

The apparatus also includes means for generating audio output based on the audio signals. For example, the means for generating audio output based on the audio signals can correspond to one of the audio output devices 104, the controller 180, the audio driver 168, the sound transducer(s) 172, one or more other circuits or components configured to generate audio output based on the audio signals, or any combination thereof.

In some implementations, the apparatus also includes means for storing output delay data including one or more playback delay values. A particular playback delay value indicates an output device total delay time between transmission of particular audio data by the host device and playout of sound corresponding to the particular audio data. For example, the means for storing the output delay data can correspond to one of the audio output devices 104, the controller 180, the memory 174, one or more other circuits or components configured to store output delay data, or any combination thereof.

In some implementations, the apparatus also includes means for sending at least one playback delay value of the one or more playback delay values to the host device to enable the host device to determine a synchronization delay to synchronize the audio output with video output by a display of the host device. For example, the means for sending the at least one playback delay value to the host device can correspond to one of the audio output devices 104, the controller 180, the wireless communication protocol stack 156, the transceiver 158, the transmitter 160, one or more other circuits or components configured to the send at leak one playback delay value to the host device, or any combination thereof.

In some implementations, the apparatus also includes means for selecting the at least one playback delay value sent to the host device based on a detected operating condition. For example, the means for selecting the at least one playback delay value sent to the host device can correspond to one of the audio output devices 104, the controller 180, one or more other circuits or components configured to select a playback delay value, or any combination thereof.

In some implementations, the apparatus also includes means for detecting a trigger event. For example, the means for detecting the trigger event can correspond to one of the audio output devices 104, the controller 180, the mode switch(es) 182, the wireless communication protocol stack 156, the transceiver 158, the receiver 162, one or more other circuits or components configured to detect the trigger event, or any combination thereof.

Particular aspects of the disclosure are described in the following inter-related clauses:

Clause 1 includes a device that includes one or more processors configured to obtain output delay data based on a transmission from an audio output device, the output delay data indicating a playback delay associated with audio output by the audio output device; determine, based on the output delay data and host delay data, a synchronization delay to coordinate audio output by the audio output device and video output at a display; initiate sending of the audio data to the audio output device; and send video data to the display, wherein the video data is delayed, based on the synchronization delay, relative to the sending of the audio data.

Clause 2 includes the device of Clause 1 wherein the output delay data indicates an output device total delay time between transmission of an audio packet to the audio output device and playout of sound corresponding to the audio packet based on testing of the audio output device.

Clause 3 includes the device of Clause 1 or Clause 2 wherein the output delay data includes a first playback delay value indicating a first playback delay associated with a first codec and a second playback delay value indicating a second playback delay associated with a second codec, wherein the first playback delay value is different from the second playback delay value.

Clause 4 includes the device of any of Clause 1 to Clause 3 wherein the host delay data indicates a host device total delay time between transmission of an audio packet to the audio output device and playout of video associated with sound of the audio packet.

Clause 5 includes the device of any of Clause 1 to Clause 4 wherein the transmitter is configured to send the audio data to the audio output device via a wireless transmission.

Clause 6 includes the device of any of Clause 1 to Clause 5 wherein the transmitter is configured to send the audio data to the audio output device via a peer-peer ad hoc connection.

Clause 7 includes the device of any of Clause 1 to Clause 6 wherein the audio output device includes headphones, one or more ear buds, or one or more speakers.

Clause 8 includes the device of any of Clause 1 to Clause 7 wherein the device includes or corresponds to a portable computing device, a game system, a mobile communication device, a tablet computing device, a smart display, or a combination thereof.

Clause 9 includes the device of any of Clause 1 to Clause 8 and further includes the display.

Clause 10 includes the device of any of Clause 1 to Clause 9 wherein the output delay data is obtained from the audio output device during configuration of a wireless connection between the transmitter and the audio output device, and further includes memory configured to store the output delay data for use during a subsequent multimedia playback.

Clause 11 includes the device of Clause 10 wherein the memory is configured to store the output delay data in a table that includes additional output delay data associated with one or more other audio output devices.

Clause 12 includes the device of any of Clause 1 to Clause 11 and further includes memory configured to store first output delay data for a first audio output device and second output delay data for a second audio output device, wherein the first output delay data is different from the second output delay data, and wherein the processor is configured to select the output delay data from the memory based on an identifier of the audio output device.

Clause 13 includes the device of any of Clause 1 to Clause 12 wherein the output delay data includes multiple playback delay values corresponding to different operating conditions, and wherein the processor is configured to select, based on an operating condition associated with multimedia playback, a particular value of the multiple playback delay values to determine the synchronization delay.

Clause 14 includes the device of Clause 13 wherein the different operating conditions correspond to use of different codecs to send the audio data to the audio output device.

Clause 15 includes the device of Clause 13 wherein the different operating conditions correspond to different operating modes of the device.

Clause 16 includes the device of Clause 15 wherein the different operating modes of the device include two or more of a gaming mode, a video call mode, or a video streaming mode.

Clause 17 includes the device of Clause 13 wherein the different operating conditions correspond to different operating modes of the audio output device.

Clause 18 includes the device of Clause 17 wherein the different operating modes of the audio output device include two or more of a noise-cancellation mode, a stereo mode, a mono mode, a surround sound mode, or a power saving mode.

Clause 19 includes the device of any of Clause 1 to Clause 18 wherein the processor is further configured to cause the transmitter to send a query to the audio output device, wherein the output delay data is obtained responsive to the query.

Clause 20 includes the device of Clause 19 wherein the query is sent based on receiving input indicating desynchronization of multimedia playback.

Clause 21 includes the device of any of Clause 1 to Clause 20 wherein the output delay data is obtained responsive to detecting a trigger event.

Clause 22 includes the device of Clause 21 wherein the trigger event corresponds to a change of operating mode of the device.

Clause 23 includes the device of Clause 21 wherein the trigger event corresponds to a change of operating mode of the audio output device.

Clause 24 includes the device of Clause 21 wherein the trigger event is detected based on a signaling characteristic between the transmitter and the audio output device.

Clause 25 includes the device of any of Clause 1 to Clause 24 wherein the processor is further configured to obtain, from the output delay data, delay parameters corresponding to at least two of: a first value corresponding to a particular codec used to encode the audio data; a second value corresponding to a sample rate associated with the audio data; a third value corresponding to a bit rate associated with transmission of the audio data; or a fourth value corresponding to a delay mode; and wherein the synchronization delay is based on the delay parameters.

Clause 26 includes the device of any of Clause 1 to Clause 25 wherein the output delay data is obtained via wireless messaging in accordance with one or more stack layers of a wireless communication protocol stack associated with a communications link between the transmitter and the audio output device.

Clause 27 includes a method that includes: Obtaining, at a host device from an audio output device, output delay data indicating a playback delay associated with audio output by the audio output device; determining, at the host device based on the output delay data and host delay data, a synchronization delay to coordinate audio output by the audio output device and video output by a display of the host device; and during multimedia playback by the host device, sending audio data from the host device to the audio output device and sending video data to the display, wherein the video data is delayed, based on the synchronization delay, relative to the sending of the audio data.

Clause 28 includes the method of Clause 27 wherein the output delay data indicates an output device total delay time between transmission of an audio packet to the audio output device and playout of sound corresponding to the audio packet based on testing of the audio output device.

Clause 29 includes the method of Clause 27 or Clause 28 wherein the output delay data includes a first playback delay value indicating a first playback delay associated with a first codec and a second playback delay value indicating a second playback delay associated with a second codec, wherein the first playback delay value is different from the second playback delay value.

Clause 30 includes the method of any of Clause 27 to Clause 29 wherein the host delay data indicates a host device total delay time between transmission of an audio packet to the audio output device and playout of video associated with sound of the audio packet.

Clause 31 includes the method of any of Clause 27 to Clause 30 wherein the audio data is sent from the host device to the audio output device via a wireless transmission.

Clause 32 includes the method of any of Clause 27 to Clause 31 wherein the audio data is sent from the host device to the audio output device via a peer-to-peer ad hoc connection.

Clause 33 includes the method of any of Clause 27 to Clause 32 wherein the audio output device includes headphones, one or more ear buds, or one or more speakers.

Clause 34 includes the method of any of Clause 27 to Clause 33 wherein the host device includes a portable computing device, a game system, a mobile communication device, a tablet computing device, a smart display, or a combination thereof.

Clause 35 includes the method of any of Clause 27 to Clause 29 wherein the display is integrated with the host device.

Clause 36 includes the method of any of Clause 27 to Clause 35 wherein the output delay data is obtained from the audio output device during configuration of a wireless communication connection between the host device and the audio output device, and further includes storing the output delay data at a memory of the host device for use during a subsequent communication session associated with the multimedia playback.

Clause 37 includes the method of Clause 36 wherein the output delay data is stored at the memory in a table that includes additional output delay data associated with one or more other audio output devices.

Clause 38 includes the method of any of Clause 27 to Clause 37 and further includes: storing, at a memory of the host device, first output delay data for a first audio output device and second output delay data for a second audio output device, wherein the first output delay data is different from the second output delay data; and during operations to establish a communications session between the host device and the audio output device, receiving, at the host device, an identifier of the audio output device, wherein the output delay data is obtained from the memory of the host device based on the identifier of the audio output device.

Clause 39 includes the method of any of Clause 27 to Clause 38 wherein the output delay data includes multiple playback delay values corresponding to different operating conditions, and further includes selecting, based on an operating condition associated with the multimedia playback, a particular value of the multiple playback delay values to determine the synchronization delay.

Clause 40 includes the method of Clause 39 wherein the different operating conditions correspond to use of different codecs to send the audio data to the audio output device.

Clause 41 includes the method of Clause 39 wherein the different operating conditions correspond to different operating modes of the host device.

Clause 42 includes the method of Clause 41 wherein the different operating modes of the host device include two or more of a gaming mode, a video call mode, or a video streaming mode.

Clause 43 includes the method of Clause 39 wherein the different operating conditions correspond to different operating modes of the audio output device.

Clause 44 includes the method of Clause 43 wherein the different operating modes of the audio output device include two or more of noise-cancellation mode, a stereo mode, a mono mode, a surround sound mode, or a power saving mode.

Clause 45 includes the method of any of Clause 27 to Clause 44 and further includes sending a query from the host device to the audio output device, wherein the output delay data is obtained responsive to the query.

Clause 46 includes the method of Clause 45 wherein the query is sent based on receiving input at the host device indicating desynchronization of the multimedia playback.

Clause 47 includes the method of any of Clause 27 to Clause 46 wherein the output delay data is obtained responsive to detecting a trigger event.

Clause 48 includes the method of Clause 47 wherein the trigger event corresponds to a change of operating mode of the host device.

Clause 49 includes the method of Clause 47 wherein the trigger event corresponds to a change of operating mode of the audio output device.

Clause 50 includes the method of Clause 47 wherein the trigger event is detected based on a signaling characteristic between the host device and the audio output device.

Clause 51 includes the method of any of Clause 27 to Clause 50 and further includes: obtaining, from the output delay data, delay parameters corresponding to at least two of: a first value corresponding to a particular codec used to encode the audio data; a second value corresponding to a sample rate associated with the audio data; a third value corresponding to a bit rate associated with transmission of the audio data; or a fourth value corresponding to a delay mode; and computing the synchronization delay based on the delay parameters.

Clause 52 includes the method of any of Clause 27 to Clause 51 wherein the output delay data is obtained via wireless messaging in accordance with one or more stack layers of a wireless communication protocol stack associated with a communications link between the host device and the audio output device.

Clause 53 includes a device that includes: means for sending audio data to the audio output device; means for receiving, via a transmission from an audio output device, output delay data indicating a playback delay associated with audio output by the audio output device; means for determining, based on the output delay data and host delay data, a synchronization delay to coordinate audio output by the audio output device and video output at a display; and means for sending video data to the display and causing the means for sending to send the audio data to the audio output device, wherein the video data is delayed, based on the synchronization delay, relative to the sending of the audio data.

Clause 54 includes the device of Clause 53 wherein the output delay data indicates an output device total delay time between transmission of an audio packet to the audio output device and playout of sound corresponding to the audio packet based on testing of the audio output device.

Clause 55 includes the device of Clause 53 or Clause 54 wherein the output delay data includes a first playback delay value indicating a first playback delay associated with a first codec and a second playback delay value indicating a second playback delay associated with a second codec, wherein the first playback delay value is different from the second playback delay value.

Clause 56 includes the device of any of Clause 53 to Clause 55 wherein the host delay data indicates a host device total delay time between transmission of an audio packet to the audio output device and playout of video associated with sound of the audio packet.

Clause 57 includes the device of any of Clause 53 to Clause 56 wherein the means for sending is configured to send the audio data to the audio output device via a wireless transmission.

Clause 58 includes the device of any of Clause 53 to Clause 57 wherein the means for sending is configured to send the audio data to the audio output device via a peer-to-peer ad hoc connection.

Clause 59 includes the device of any of Clause 53 to Clause 58 wherein the audio output device includes head-phones, one or more ear buds, or one or more speakers.

Clause 60 includes the device of any of Clause 53 to Clause 59 wherein the device includes or corresponds to a portable computing device, a game system, a mobile communication device, a tablet computing device, a smart display, or a combination thereof.

Clause 61 includes the device of any of Clause 53 to Clause 60 and further includes the display.

Clause 62 includes the device of any of Clause 53 to Clause 61 wherein the output delay data is obtained from the audio output device during configuration of a wireless connection between the means for sending and the audio output device, and further includes means for storing the output delay data for use during a subsequent multimedia playback.

Clause 63 includes the device of Clause 62 wherein the means for storing is configured to store the output delay data in a table that includes additional output delay data associated with one or more other audio output devices.

Clause 64 includes the device of any of Clause 53 to Clause 63 and further includes means for storing first output delay data for a first audio output device and second output delay data for a second audio output device, wherein the first output delay, data is different from the second output delay data, and wherein the means for determining is configured to select the output delay data from the means for storing based on an identifier of the audio output device.

Clause 65 includes the device of any of Clause 53 to Clause 64 wherein the output delay data includes multiple playback delay values corresponding to different operating conditions, and wherein the means for determining is configured to select, based on an operating condition associated with multimedia playback, a particular value of the multiple playback delay values to determine the synchronization delay.

Clause 66 includes the device of Clause 65 wherein the different operating conditions correspond to use of different codecs to send the audio data to the audio output device.

Clause 67 includes the device of Clause 65 wherein the different operating conditions correspond to different operating modes of the device.

Clause 68 includes the device of Clause 67 wherein the different operating modes of the device include two or more of a gaming mode, a video call mode, or a video streaming mode.

Clause 69 includes the device of Clause 65 wherein the different operating conditions correspond to different operating modes of the audio output device.

Clause 70 includes the device of Clause 70 wherein the different operating modes of the audio output device include two or more of noise-cancellation mode, a stereo mode, a mono mode, a surround sound mode, or a power saving mode.

Clause 71 includes the device of any of Clause 53 to Clause 70 wherein the means for determining is further configured to cause the means for sending to send a query to the audio output device, wherein the output delay data is obtained responsive to the query.

Clause 72 includes the device of Clause 71 wherein the query is sent based on receiving input indicating desynchronization of multimedia playback.

Clause 73 includes the device of any of Clause 53 to Clause 72 wherein the output delay data is obtained responsive to detecting a trigger event.

Clause 74 includes the device of Clause 73 wherein the trigger event corresponds to a change of operating mode of the device.

Clause 75 includes the device of Clause 73 wherein the trigger event corresponds to a change of operating mode of the audio output device.

Clause 76 includes the device of Clause 73 wherein the trigger event is detected based on a signaling characteristic between the means fir sending and the audio output device.

Clause 77 includes the device of any of Clause 53 to Clause 76 wherein the means for determining is further configured to obtain, from the output delay data, delay parameters corresponding to at least two of: a first value corresponding to a particular codec used to encode the audio data; a second value corresponding to a sample rate associated with the audio data; a third value corresponding to a bit rate associated with transmission of the audio data; or a fourth value corresponding to a delay mode; and wherein the synchronization delay is based on the delay parameters.

Clause 78 includes the device of any of Clause 53 to Clause 77 wherein the output delay data is obtained via wireless messaging in accordance with one or more stack layers of a wireless communication protocol stack associated with a communications link between the means for sending and the audio output device.

Clause 79 includes a device that includes: a receiver configured to receive signals encoding audio data from a host device; a decoder configured to decode the signals to generate audio signals based on the audio data; one or more sound transducers configured to generate audio output based on the audio signals; a memory configured to store output delay data including one or more playback delay values, a particular playback delay value indicating an output device total delay time between transmission of particular audio data by the host device and playout of sound corresponding to the particular audio data by the one or more sound transducers; and a transmitter configured to send at least one playback delay value of the one or more playback delay values to the host device to enable the host device to determine a synchronization delay to synchronize the audio output with video output by a display of the host device.

Clause 80 includes the device of Clause 79 wherein the one or more playback delay values include a first playback delay value associated with use of a first codec to encode the audio data and a second playback delay value associated with use of a second codec to encode the audio data, wherein the first playback delay value is different from the second playback delay value.

Clause 81 includes the device of Clause 79 or Clause 80 wherein the device includes or corresponds to headphones, one or more ear buds, or one or more speakers.

Clause 82 includes the device of any of Clause 79 to Clause 81 wherein the host device includes a portable computing device, a game system, a mobile communication device, a tablet computing device, a smart display, or a combination thereof.

Clause 83 includes the device of any of Clause 79 to Clause 82 wherein the one or more playback delay values include multiple playback delay values corresponding to different operating conditions.

Clause 84 includes the device of Clause 83 and further includes a controller configured to select the at least one playback delay value sent to the host device based on a detected operating condition.

Clause 85 includes the device of Clause 83 wherein sending the at least one playback delay value to the host device includes sending the multiple playback delay values and data identifying the different operating conditions.

Clause 86 includes the device of Clause 83 wherein the different operating conditions correspond to use of different codecs.

Clause 87 includes the device of Clause 83 wherein the different operating conditions correspond to different operating modes of the device.

Clause 88 includes the device of Clause 87 wherein the different operating modes of the device include two or more of noise-cancellation mode, a stereo mode, a mono mode, a surround sound mode, or a power saving mode.

Clause 89 includes the device of any of Clause 79 to Clause 88 and further includes a controller configured to cause the transmitter to send the at least one playback delay value to the host device responsive to receiving a query from the host device.

Clause 90 includes the device of any of Clause 79 to Clause 89 and further includes a controller configured to detect a trigger event and to cause the transmitter to send the at least one playback delay value to the host device responsive to detecting the trigger event.

Clause 91 includes the device of Clause 90 wherein the trigger event corresponds to a change of operating mode of the device.

Clause 92 includes the device of Clause 90 wherein the trigger event is detected based on a signaling characteristic between the host device and the receiver.

Clause 93 includes the device of any of Clause 79 to Clause 92 wherein the transmitter is configured to send the output delay data via wireless messaging in accordance with one or more stack layers of a wireless communication protocol stack associated with a communications link between the host device and the device.

Clause 94 includes the device of Clause 93 wherein the communications link includes or corresponds to a wireless peer-to-peer ad hoc connection.

Clause 95 includes the device of any of Clause 79 to Clause 94 wherein the transmitter is configured to send the at least one playback delay value to the host device during a data exchange to establish a wireless peer-to-peer ad hoc connection with the host device.

Clause 96 includes a method that includes: storing, at a memory of an audio output device, output delay data indicating a playback delay associated with audio output by the audio output device; and sending the output delay data to a host device to enable the host device to determine a synchronization delay to coordinate audio output by the audio output device and video output by a display device.

Clause 97 includes the method of Clause 96 wherein the output delay data indicates an output device total delay time between transmission of an audio packet to the audio output device and playout of sound corresponding to the audio packet based on testing of the audio output device.

Clause 98 includes the method of Clause 96 or Clause 97 wherein the output delay data includes a first playback delay value indicating a first playback delay associated with a first codec and a second playback delay value indicating a second playback delay associated with a second codec, wherein the first playback delay value is different from the second playback delay value.

Clause 99 includes the method of any of Clause 96 to Clause 98 and further includes receiving audio data from the host device via a wireless transmission and generating the audio output based on the audio data.

Clause 100 includes the method of any of Clause 96 to Clause 99 and further includes: establishing a wireless peer-to-peer ad hoc connection with the host device, wherein the output delay data is sent to the host device via the wireless peer-to-peer ad hoc connection; and after sending the output delay data to the host device, receiving audio data from the host device via the wireless peer-to-peer ad hoc connection.

Clause 101 includes the method of any of Clause 96 to Clause 100 wherein the audio output device includes headphones, one or more ear buds, or one or more speakers.

Clause 102 includes the method of any of Clause 96 to Clause 101 wherein the host device includes a portable computing device, a game system, a mobile communication device, a tablet computing device, a smart display, or a combination thereof.

Clause 103 includes the method of any of Clause 96 to Clause 102 wherein the output delay data includes multiple playback delay values corresponding to different operating conditions, and further includes selecting, based on a detected operating condition, a particular value of the multiple playback delay values to send to the host device.

Clause 104 includes the method of Clause 103 wherein the different operating conditions correspond to use of different codecs.

Clause 105 includes the method of Clause 103 wherein the different operating conditions correspond to different operating modes of the audio output device.

Clause 106 includes the method of Clause 105 wherein the different operating modes of the audio output device include two or more of a noise-cancellation mode, a stereo mode, a mono mode, a surround sound mode, or a power saving mode.

Clause 107 includes the method of any of Clause 96 to Clause 106 and further includes receiving, at the audio output device, a query from the host device, wherein the output delay data is sent responsive to the query.

Clause 108 includes the method of any of Clause 96 to Clause 107 wherein the output delay data is sent responsive to detecting a trigger event.

Clause 109 includes the method of Clause 108 wherein the trigger event corresponds to a change of operating mode of the audio output device.

Clause 110 includes the method of Clause 108 wherein the trigger event is detected based on a signaling characteristic between the host device and the audio output device Clause 111 includes the method of any of Clause 96 to Clause 110 wherein the output delay data is sent via wireless messaging in accordance with one or more stack layers of a wireless communication protocol stack associated with a communications link between the host device and the audio output device.

Clause 112 includes a device that includes means for receiving signals encoding audio data from a host device; means for decoding the signals to generate audio signals based on the audio data; means for generating audio output based on the audio signals; means for storing output delay data including one or more playback delay values, a particular playback delay value indicating an output device total delay time between transmission of particular audio data by the host device and playout of sound corresponding to the particular audio data by the means for generating audio output; and means for sending at least one playback delay value of the one or more playback delay values to the host device to enable the host device to determine a synchronization delay to synchronize the audio output with video output by a display of the host device.

Clause 113 includes the device of Clause 112 wherein the one or more playback delay values include a first playback delay value associated with use of a first codec to encode the audio data and a second playback delay value associated with use of a second codec to encode the audio data, wherein the first playback delay value is different from the second playback delay value.

Clause 114 includes the device of Clause 112 or Clause 113 wherein the device includes or corresponds to headphones, one or more ear buds, or one or more speakers.

Clause 115 includes the device of any of Clause 112 to Clause 114 wherein the host device includes a portable computing device, a game system, a mobile communication device, a tablet computing device, a smart display, or a combination thereof.

Clause 116 includes the device of any of Clause 112 to Clause 115 wherein the one or more playback delay values include multiple playback delay values corresponding to different operating conditions.

Clause 117 includes the device of Clause 116 and further includes means for selecting the at least one playback delay value sent to the host device based on a detected operating condition Clause 118 includes the device of Clause 116 wherein sending the at least one playback delay value to the host device includes sending the multiple playback delay values and data identifying the different operating conditions.

Clause 119 includes the device of Clause 116 wherein the different operating conditions correspond to use of different codecs.

Clause 120 includes the device of Clause 116 wherein the different operating conditions correspond to different operating modes of the device.

Clause 121 includes the device of Clause 12.0 wherein the different operating modes of the device include two or more of noise-cancellation mode, a stereo mode, a mono mode, a surround sound mode, or a power saving mode.

Clause 122 includes the device of any of Clause 112 to Clause 121 and further includes means for detecting a trigger event, the means for detecting the trigger event configured to cause the means for sending to send the at least one playback delay value to the host device responsive to detecting the trigger event.

Clause 123 includes the device of Clause 122 wherein the trigger event corresponds to a change of operating mode of the device.

Clause 124 includes the device of Clause 122 wherein the trigger event is detected based on a signaling characteristic between the host device and the means for receiving signals.

Clause 125 includes the device of any of Clause 112 to Clause 124 wherein the means for sending is configured to send the output delay data via wireless messaging in accordance with one or more stack layers of a wireless communication protocol stack associated with a communications link between the host device and the device.

Clause 126 includes the device of Clause 125 wherein the communications link includes or corresponds to a wireless peer-to-peer ad hoc connection.

Clause 127 includes the device of any of Clause 112 to Clause 126 wherein the means for sending is configured to send the at least one playback delay value to the host device during a data exchange to establish a wireless peer-to-peer ad hoc connection with the host device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. For example, any of the operations described with reference to FIGS. 8-21 may be initiated, controlled, or performed by one or more processors executing instructions from a computer-readable storage device (e.g., a memory device). A software module (e.g., processor-executable instructions) may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a display; and
one or more processors configured to:
obtain, based on a transmission from an audio output device, output delay data, the output delay data indicating a particular playback delay value associated with audio output by the audio output device;
determine, based on the output delay data and host delay data, a synchronization delay to coordinate audio output by the audio output device and video output at the display, wherein the output delay data includes a first playback delay value indicating a first playback delay associated with a first codec and a second playback delay value indicating a second playback delay associated with a second codec, wherein the first playback delay value is different from the second playback delay value;
initiate sending-audio data of multimedia content to the audio output device; and
send video data of the multimedia content to the display, wherein the video data is delayed, based on the synchronization delay, relative to the sending of the audio data.

2. The device of claim 1, wherein the output delay data indicates an output device total delay time between transmission of an audio packet to the audio output device and playout of sound corresponding to the audio packet and is based on testing of the audio output device.

3. The device of claim 1, wherein the host delay data indicates a host device total delay time between transmission of an audio packet to the audio output device and playout of video associated with sound of the audio packet.

4. The device of claim 1, further comprising a modem coupled to the one or more processors, wherein the one or more processors are configured to initiate sending the audio data to the audio output device via the modem.

5. The device of claim 4, further comprising a transmitter coupled to the modem to transmit the audio data to the audio output device via a wireless peer-to-peer ad hoc connection.

6. The device of claim 1, wherein the audio output device includes headphones, one or more ear buds, or one or more speakers.

7. The device of claim 1, wherein the device includes or corresponds to a portable computing device, a game system, a mobile communication device, a tablet computing device, a smart display, or a combination thereof.

8. The device of claim 1, wherein the output delay data is obtained from the audio output device during configuration of a wireless connection with the audio output device, and further comprising a memory configured to store the output delay data for use during a subsequent multimedia playback.

9. The device of claim 1, further comprising a memory configured to store a first playback delay value for the first audio output device and the second playback delay value for a second audio output device, wherein the one or more processors are configured to select the particular playback delay value from the memory based on an identifier of the audio output device.

10. The device of claim 1, wherein the particular playback delay value is selected from a plurality of playback delay values, wherein the plurality of playback delay values correspond to different operating conditions, and wherein the one or more processors are configured to select, based on an operating condition associated with multimedia playback, the particular playback delay value to determine the synchronization delay.

11. The device of claim 10, wherein the different operating conditions correspond to use of different codecs to encode the audio data in conjunction with transmission of the audio data to the audio output device.

12. The device of claim 10, wherein the different operating conditions correspond to different operating modes of the device.

13. The device of claim 12, wherein the different operating modes of the device include two or more of a gaming mode, a video call mode, or a video streaming mode.

14. The device of claim 10, wherein the different operating conditions correspond to different operating modes of the audio output device.

15. The device of claim 1, wherein the one or more processors are further configured to initiate sending of a query to the audio output device, wherein the output delay data is obtained responsive to the query.

16. The device of claim 1, wherein the output delay data is obtained responsive to detecting a trigger event.

17. The device of claim 1, wherein the one or more processors are further configured to obtain, from the output delay data, delay parameters corresponding to at least two of a first value corresponding to a particular codec used to encode the audio data;

a second value corresponding to a sample rate associated with the audio data;

a third value corresponding to a bit rate associated with transmission of the audio data; or a fourth value corresponding to a delay mode; and wherein the synchronization delay is based on the delay parameters.

18. The device of claim 1, wherein the output delay data is obtained via wireless messaging in accordance with one or more stack layers of a wireless communication protocol stack associated with a communications link with the audio output device.

19. A method comprising obtaining, at a host device based on a transmission from an audio output device, output delay data indicating a particular playback delay value associated with audio output by the audio output device, the host device including a display, wherein the output delay data includes a first playback delay value indicating a first playback delay associated with a first codec and a second playback delay value indicating a second playback delay associated with a second codec, wherein the first playback delay value is different from the second playback delay value;

determining, at the host device based on the output delay data and host delay data, a synchronization delay to coordinate audio output by the audio output device and video output by the display of the host device; and during playback of multimedia content by the host device, sending audio data of the multimedia content from the host device to the audio output device and sending video data of the multimedia content to the display, wherein the video data is delayed, based on the synchronization delay, relative to the sending of the audio data.

20. The method of claim 19, wherein the output delay data indicates an output device total delay time between transmission of an audio packet to the audio output device and playout of sound corresponding to the audio packet and is based on testing of the audio output device.

21. The method of claim 19, wherein the audio data is sent from the host device to the audio output device via a peer-to-peer ad hoc connection.

22. The method of claim 19, wherein the particular playback delay value is selected from a plurality of playback delay values, wherein the plurality of playback delay values correspond to different operating conditions, and further comprising selecting, based on an operating condition associated with the playback of the multimedia content, the particular playback delay value to determine the synchronization delay.

23. The method of claim 19, further comprising sending a query from the host device to the audio output device, wherein the output delay data is obtained responsive to the query.

24. The method of claim 19, wherein the output delay data is obtained responsive to detecting a trigger event.

25. A device comprising:

a display;

means for sending audio data to an audio output device;

means for obtaining, based on a transmission from the audio output device, output delay data indicating a particular playback delay value associated with audio output by the audio output device, wherein the output delay data includes a first playback delay value indicating a first playback delay associated with a first codec and a second playback delay value indicating a second playback delay associated with a second codec, wherein the first playback delay value is different from the second playback delay value; and means for synchronizing playback of multimedia content, the means for synchronizing playback configured to:

determine, based on the output delay data and host delay data, a synchronization delay to coordinate audio output by the audio output device and video output at the display;

cause the means for sending audio data to send the audio data of the multimedia content to the audio output device; and send video data of the multimedia content to the display, wherein the video data is delayed, based on the synchronization delay, relative to the sending of the audio data.

26. A system comprising:

a host device including a display; and an audio output device including:

a receiver configured to receive signals encoding audio data from the host device and to generate audio signals based on the audio data;

one or more sound transducers configured to generate audio output based on the audio signals;

a memory configured to store output delay data including one or more playback delay values, a particular playback delay value indicating an output device total delay time between transmission of particular audio data by the host device and playout of sound corresponding to the particular audio data by the one or more sound transducers; and a transmitter configured to send at least one playback delay value of the one or more playback delay values to the host device to enable the host device to determine a synchronization delay to synchronize the audio output with video output by the display of the host device.

27. The system of claim 26, wherein the one or more playback delay values include a first playback delay value associated with use of a first codec to decode the audio data and a second playback delay value associated with use of a second codec to decode the audio data, wherein the first playback delay value is different from the second playback delay value.

28. The system of claim 26, wherein the one or more playback delay values include multiple playback delay values corresponding to different operating conditions.

* * * * *